(12) United States Patent
Zhu et al.

(10) Patent No.: US 11,604,994 B2
(45) Date of Patent: Mar. 14, 2023

(54) EXPLAINABLE MACHINE LEARNING BASED ON HETEROGENEOUS DATA

(71) Applicant: International Business Machines Corporation, Armonk, NY (US)

(72) Inventors: Yada Zhu, Irvington, NY (US); Yang Zhang, Cambridge, MA (US); Pin-Yu Chen, White Plains, NY (US); Kumar Bhaskaran, Englewood Cliffs, NJ (US)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 16/523,314

(22) Filed: Jul. 26, 2019

(65) Prior Publication Data
US 2020/0410355 A1 Dec. 31, 2020

Related U.S. Application Data

(60) Provisional application No. 62/868,161, filed on Jun. 28, 2019.

(51) Int. Cl.
| | |
|---|---|
| *G06N 3/08* | (2006.01) |
| *G06N 20/00* | (2019.01) |
| *G06F 17/16* | (2006.01) |
| *G06K 9/62* | (2022.01) |
| *G06N 3/082* | (2023.01) |

(52) U.S. Cl.
CPC ............ *G06N 3/082* (2013.01); *G06F 17/16* (2013.01); *G06K 9/6215* (2013.01); *G06K 9/6218* (2013.01); *G06N 20/00* (2019.01)

(58) Field of Classification Search
CPC ........ G06N 3/082; G06N 20/00; G06F 17/16; G06K 9/6215; G06K 9/6218
USPC .......................................................... 706/15
See application file for complete search history.

(56) References Cited

U.S. PATENT DOCUMENTS

| | | | |
|---|---|---|---|
| 2006/0036542 A1* | 2/2006 | McNair .................. | G06Q 40/04 705/39 |
| 2014/0107828 A1 | 4/2014 | Zhu et al. | |
| 2016/0196587 A1* | 7/2016 | Eder .................. | G06Q 30/0271 705/14.49 |
| 2018/0260704 A1 | 9/2018 | Sun et al. | |
| 2019/0325293 A1* | 10/2019 | Wang .................. | G06K 9/6256 |

OTHER PUBLICATIONS

Cao, Da, et al., "Attentive Group Recommendation", SIGIR '18, Ann Arbor, MI, Jul. 8-12, 2018, Session 5D: Recommender Systems—Applications, pp. 645-654.*

(Continued)

*Primary Examiner* — Robert Stevens
(74) *Attorney, Agent, or Firm* — Scully, Scott, Murphy & Presser, P.C.; Daniel P. Morris

(57) ABSTRACT

Methods and systems for explainable machine learning are described. In an example, a processor can receive a data set from a plurality of data sources corresponding to a plurality of domains. The processor can train a machine learning model to learn a plurality of vectors that indicate impact of the plurality of domains on a plurality of assets. The machine learning model can be operable to generate forecasts relating to performance metrics of the plurality of assets based on the plurality of vectors. In some examples, the machine learning model can be a neural attention network with shared hidden layers.

20 Claims, 16 Drawing Sheets

(56) References Cited

OTHER PUBLICATIONS

Thenmozhi, M., "Forecasting Stock Index Returns Using Neural Networks", Delhi Business Review, vol. 7, No. 2, Jul.-Dec. 2006, pp. 59-69.*
Xiao, Jun, et al., "Attention Factorization Machines: Learning the Weight of Feature Interactions via Attention Networks", arXiv, Cornell University, document No. arXiv:1708.04617v1, Aug. 15, 2017, 7 pages.*
Riemer, Matthew, et al., "Correcting Forecasts with Multifactor Neural Attention", Proc. of the 33rd International Conf. on Machine Learning, New York, NY, © 2016, 10 pages.*
Zheng et al., "Deep Multimodality Model for Multi-Task Multi-View Learning", Arxiv preprint arXiv:1901.08723; Jan. 25, 2019, pp. 1-9.
Mell et al., "The NIST Definition of Cloud Computing", NIST, Special Publication 800-145, Sep. 2011, pp. 1-7.

* cited by examiner

US 11,604,994 B2

EXPLAINABLE MACHINE LEARNING BASED ON HETEROGENEOUS DATA

BACKGROUND

The present application relates generally to computers and computer applications, and more particularly to machine learning systems that can be implemented to train machine learning models to perform predictions and forecasting.

Machine learning models can be trained and run by a hardware processor to perform predictions and generate forecasts relating to an input. Some machine learning models can be trained using heterogeneous data, which can be data of different modalities and tasks. Different modalities can be referring to, for example, a mixed dataset from different domains (e.g., a data set that includes both images and texts), where the data from different domains may require different data processing prior to being used as training data of a training set. Different tasks may be, for example, classification of objects into different object types (e.g., N object types=N tasks).

SUMMARY

In some examples, a system for explainable machine learning is generally described. The system can include a memory and a processor configured to be in communication with each other. The processor can be configured to receive a data set from a plurality of data sources corresponding to a plurality of domains. The processor can be further configured to train a machine learning model to learn a plurality of vectors that indicate impact of the plurality of domains on a plurality of assets. The machine learning model can be operable to generate forecasts relating to performance metrics of the plurality of assets based on the plurality of vectors.

In some examples, a method for explainable machine learning is generally described. The method can include receiving, by a processor, a data set from a plurality of data sources corresponding to a plurality of domains. The method can further include training, by the processor, a machine learning model to learn a plurality of vectors that indicate impact of the plurality of domains on a plurality of assets. The machine learning model can be operable to generate forecasts relating to performance metrics of the plurality of assets based on the plurality of vectors.

In some examples, a computer program product for explainable machine learning is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

By way of example, financial time series analysis can provide for optimizing investment decision and hedging market risks. This can be a challenging task as the problems can be accompanied by dual-level (e.g., data-level and task-level) heterogeneity. For instance, in stock price forecasting, a successful portfolio with bounded risks can include a large number of stocks from diverse domains (e.g., utility, information technology, healthcare, etc.), and forecasting stocks in each domain can be treated as one task; within a portfolio, each stock can be characterized by temporal data collected from multiple modalities (e.g., finance, weather, and news), which corresponds to the data-level heterogeneity. The finance industry, for example, can follow regulated processes, which may require prediction models trained by a computer system to be interpretable, and the output results to meet compliance. In an aspect, a research question can be how to build a model (e.g., a computer-implemented model) that can achieve satisfactory performance on multi-modality multi-task learning problems, while being able to provide comprehensive explanations for the end users.

Figure 1:
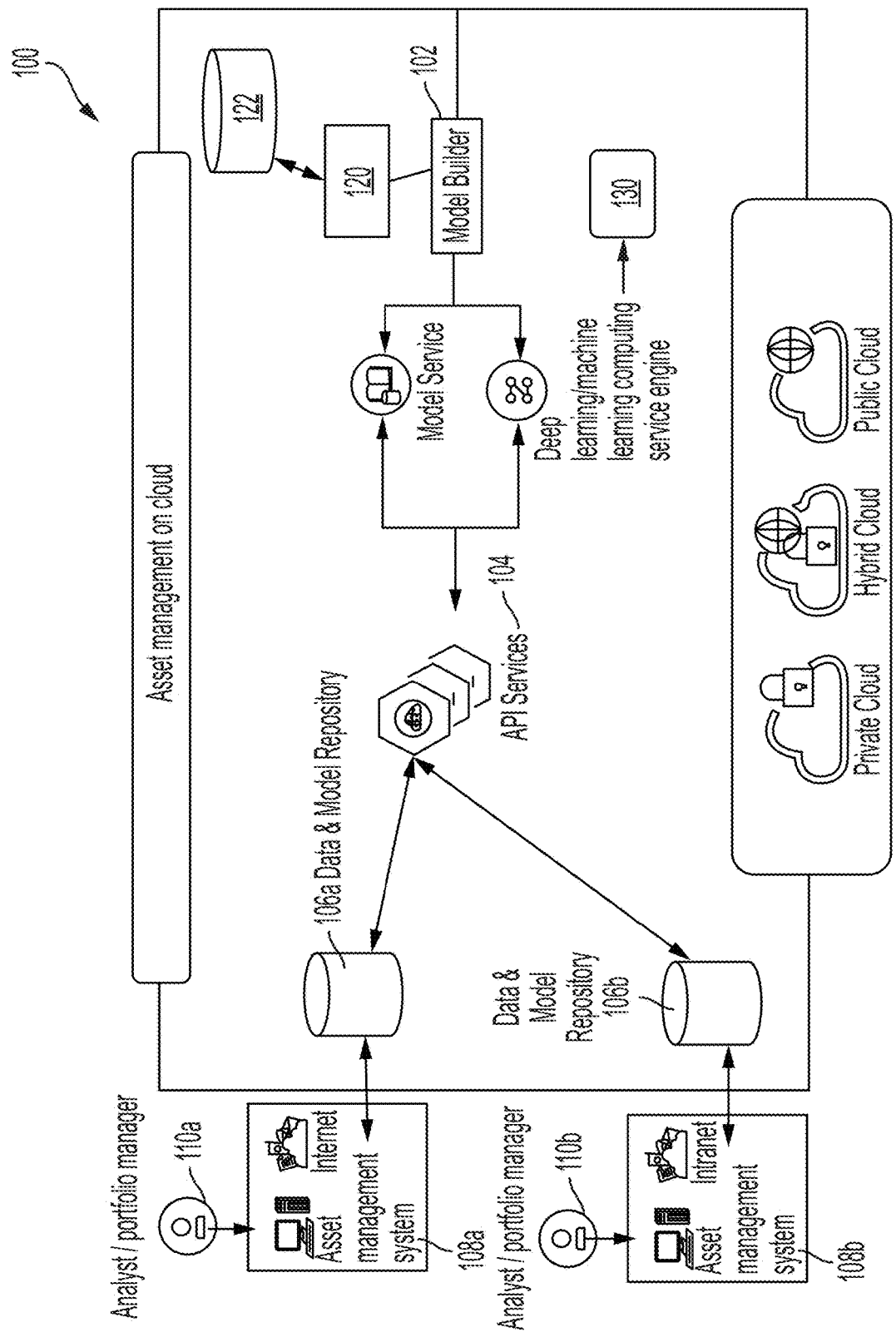
FIG. 1 is a diagram showing an example computer system that can implement explainable machine learning based on heterogeneous data in one embodiment.

FIG. 1 is a diagram showing an example computer system 100 that can implement explainable machine learning based on heterogeneous data in one embodiment. The system 100 can be a cloud-based system, such as a computing system being implemented by a cloud-computing platform. The system 100 can include a processor 120 and a memory 122 configured to be in communication with each other. The processor 120 and the memory 122 can be components of a computer device, where the computer device can be, for example, a desktop computer, a laptop computer, a server, and/or other types of computer devices. In some examples, the processor 120 can be one or more cores among a multi-core processor, a special purpose processor, a programmable device, and/or other types of hardware.

The system 100 can further include a model builder 102, one or more application programming interface(s) (API) 104, one or more data model repositories 106 (including 106a, 106b), and one or more asset management systems 108 (including 108a, 108b). In some examples, the data model repositories 106 can be parts (e.g., memory partitions) of the memory 122. In some examples, the model builder 102 can be implemented by the processor 120, or can be a component integrated into (or embedded on) the processor 120. In some examples, the model builder 102 can include code, such as source code, object code, and/or executable code. The processor 120 can be configured to implement the model builder 102 to build a machine learning model 130 ("model 130") using various learning techniques, such as deep learning techniques. In some examples, the model 130 can be a deep learning neural network. Training and structure of the model 130 will be described in more detail below. In some examples, one or more components of the system 100 can be components of a cloud computing platform. In some examples, the model builder 102 can deploy the trained model 130 to be run by the processor 120. In some examples, the model builder 102 or the processor 120 can deploy or distribute the trained model 130 to one or more devices or processors outside of the system 100, such that the one or more devices or processors can run the trained model 130 to receive individual inputs and generate forecasts and predictions for the individual inputs.

The APIs 104 can be implemented by a plurality of devices that belong to a plurality of domains, and the APIs 104 can output data of a respective domain. For example, a weather API can be implemented by a server of a weather forecast platform to provide weather-related data to the system 100. The data outputted by the APIs 104 can be received at the processor 120, and the processor 120 (or model builder 102) can use the data outputted by the APIs 104, in additional to historical data corresponding to one or more assets, to train the model 130. The data being outputted by the APIs 104 can be stored in the memory 122 and/or the data model repositories 106.

The asset management systems 108 can be configured to access data stored in the data model repositories 106. The asset management systems 108 can be operated by respective end users. For example, an end user 110a can operate the asset management system 108a and an end user 110b can operate the asset management system 108b. An asset management system (e.g., 108) can be implemented as a portfolio management system to manage a portfolio including a plurality of assets (e.g., equities, stocks, investment products, etc.). The asset manage system 108 can provide a platform for an end user to generate a portfolio and to determine various performance metrics of the generated portfolio. Further, the asset management system 108 can provide a platform for an end user to determine various performance metrics of a particular asset. For example, an end user can select and/or upload one or more assets, and the processor 120 can apply or run the model 130 to generate various performance metrics of the selected or uploaded assets. Some examples of these performance metrics can include a forecast of revenue growth, earnings, asset future, benchmark portfolio performance, returns, and/or other performance metrics. Further, the performance metrics being outputted by the application of the model 130 can include time-series data, such that forecasted performance metrics across different time epochs can be presented or displayed to the end users via the asset management systems 108.

In an example, the processor 120 and the memory 122 can be components of a cloud computing platform configured to provide applications that may be necessary to run the asset management systems 108 on a plurality of end user devices. The processor 120 and the end user devices can be communication nodes of a computer network, where data relating to these asset management applications can be communicated among these communication nodes. The APIs 104 can be implemented by a plurality of computer devices associated with different domains. The system 100 can be formed by integrating the computer devices, that are implementing the APIs 104, into the computer network as new communication nodes. As a result of this integration, the processor 120 can utilize data provided by the APIs 104 to implement the system 100 and the methods being described herein. Further, the processor 120 can be integrated with, for example, the model builder 102, to process the data obtain from the APIs 104 and use the processed data to generate machine-readable training data that can be used by the processor 120 to develop and train the model 130 using the methods described herein. The model 130, that can be trained based on the data obtained from the integrated APIs 104 and the integrated model builder 102, can output, to the asset management system 108, forecasts of different performance metrics with respect to different domains for one or more assets or portfolios. The outputted forecasts can provide a prediction on the performance metrics of assets, interpretations of the prediction results, and impact of different domains on different performance metrics.

To be described in more detail below, the system 100 can provide a neural attention network based time series forecasting system that can (i) model multi-modality data, (ii) automatically explore the hierarchical structure regarding task heterogeneity, and (iii) explain the forecasting results to end users. The system 100 can train the model 130 based on data heterogeneity and task heterogeneity, such as using multi-modality and multi-task time series data as training data. The model 130 can be trained based on a domain adaptive neural attention network, which can be capable of simultaneously learning from neural attentions (e.g., soft parameters) and shared hidden layers. In addition, to ensure an interpretability of the system 100, a trinity attention mechanism is integrated into the system 100, which allows end users to investigate the importance ratio of observed data in three dimensions (e.g., tasks, modality, and time) to enhance interpretations of prediction results outputted by the model 130.

FIGS. 2A-2E are diagrams showing a user interface 200 that can be used to implement explainable machine learning based on heterogeneous data in one embodiment. The descriptions of FIGS. 2A-2E may reference at least some of the components of FIG. 1.

In an example, an end user can use the asset management system 108 to select at least one asset to request the system 100 to provide a forecast of the selected assets, or to select at least one asset to request the system 100 to construct a portfolio and provide various performance metrics of the constructed portfolio. The asset management system 108 can include a computer device that can output a user interface 200 shown in FIG. 2A. The user interface 200 can include a plurality of input fields 202, 204, 206, 208 that may be buttons, drop down menus, text boxes, and/or other types of input fields. An end user can provide inputs and make selections using these input fields among the user interface 200. The system 100, or the processor 120, can receive the inputs and selections via the input fields of the user interface 200. For example, in an example shown in FIG. 2A, an end user can select "Equity" under the category "Asset Class", selected "European" under the category "Market", and selected "Healthcare" under the category "Sector". In some examples, the processor 120 can run the model 130 with the inputs and selections received via the user interface 200. Further, the end user can select a target performance metric, such as "Revenue", from a field 206, to specify a performance metric to be forecasted by the model 130. Further, the end user can select a forecast horizon, such as "Q0", to specify a time epoch to forecast the selected target performance metric in field 206. The end user can use the "Submit" button 202 upon selecting the different items under the different categories and fields 206, 208, to request the system 100 to run the model 130 on the inputs and data corresponding to the selected assets and/or items in the user interface 200. Thus, the processor 120 can run the model 130 to generate a forecast of a performance metric relating to "Revenue" (selected in field 206), within the time epoch "Q0" (selected in field 208), for one or more assets that can be categorized into "Equity" asset class, "European" market, and "healthcare" sector, based on the received inputs and selections via the user interface 120. In some examples, the end user can also select the "Browse" button 204 to upload a list of assets for constructing a portfolio, instead of making the selections under the different categories provided by the user interface 200. For example, an end user can upload a list of fifty assets that may belong to different asset classes, markets, and sectors, and the processor 120 can apply or run the model 130 with the inputs and data corresponding to the fifty assets to generate forecasts relating to performances of the fifty assets, or performances of a portfolio that can include these fifty assets.

The system 100 can receive the selections made by the end user in the user interface 200, and identify data related to the selections from the data repositories 106, the memory 122, and from the outputs of the APIs 104. The system 100 can run the model 130 with the identified data to generate an output. Some examples of the output generated by the application of the model 130 are shown in FIGS. 2B to 2E.

Figure 2A:
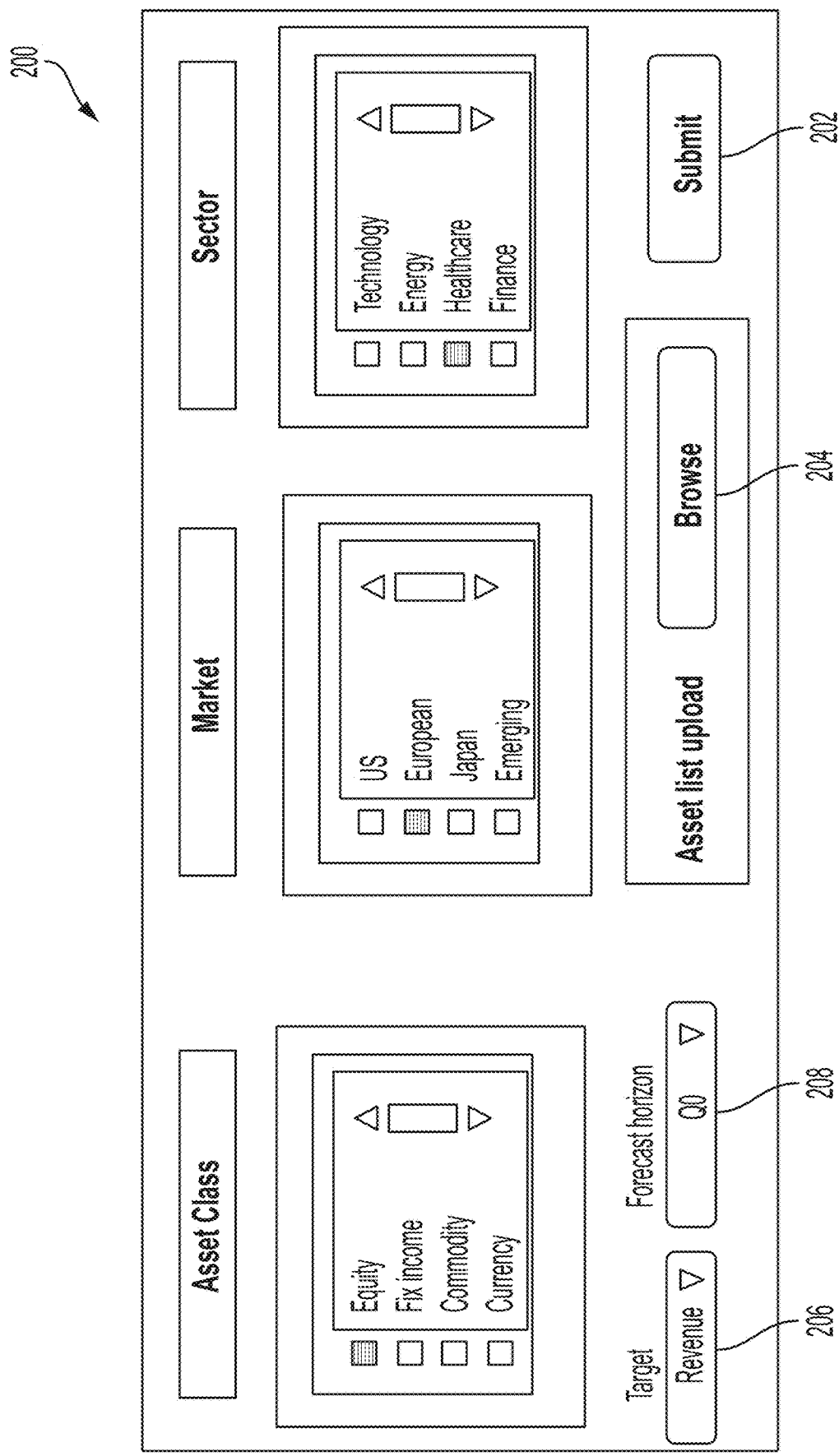
FIG. 2A is a diagram showing a user interface that can be used to implement explainable machine learning based on heterogeneous data in one embodiment.
Figure 2B:
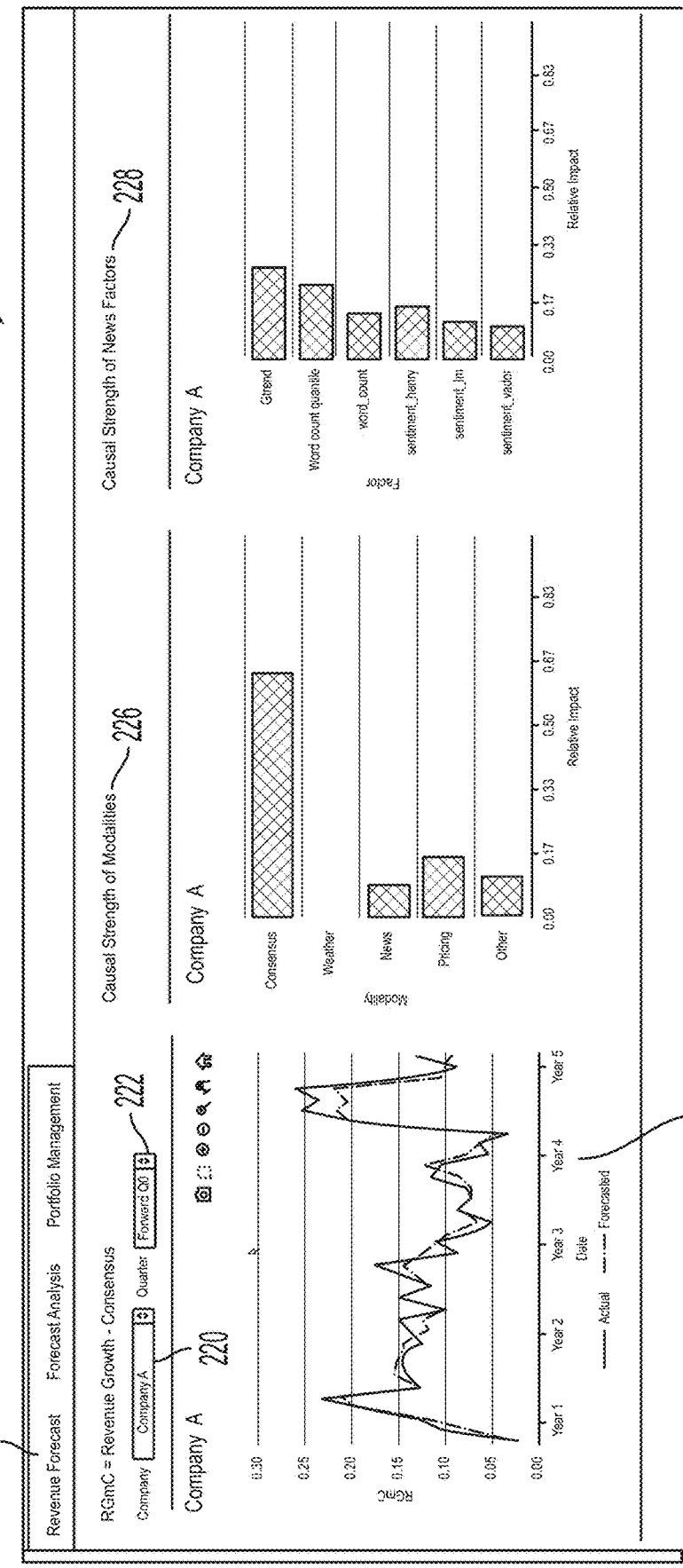
FIG. 2B is a diagram showing a user interface that can be used to implement explainable machine learning based on heterogeneous data in one embodiment.

In an example shown in FIG. 2B, the system 100 can output a revenue forecast page in response to an end user selecting a tab 201. The revenue forecast page can include a "Revenue Growth—Consensus" graph 224 that shows an actual revenue growth and forecasted revenue growth of a company ("Company A"). The system 100 can also output graphs showing impact of various factors on the forecasted performance of an asset or a portfolio. For example, in the example shown in Fig. B, the system 100 can output a graph 226 indicating a causal strength, which can be an indicator of a level of impact, of different modalities (e.g., consensus, weather, news, pricing, other) with respect to the forecasted revenue growth of Company A shown in graph 224. In another example shown in Fig. B, the system 100 can output a graph 228 indicating a causal strength of different variables (word count, sentiment, and trending of particular keywords) of a particular modality (news) with respect to the forecasted revenue growth of Company A shown in graph 224. The outputs indicating causal strength of various modalities are results of the model 130 being trained in accordance with the methods disclosed herein (the training will be described below). An end user can change the information being displayed in the user interface 200 by selecting different items from the fields 220 and 222. For example, the field 220 allows an end user to select different companies and the field 222 allows the end user to select different time epochs. The contents of the graphs 224, 226, and 228 can be changed in response to the selections being made by the end user in the fields 220, 222. The changes are a result of a re-application of the model 130 on a different set of data being identified by the processor 120 in response to the selections being made by the end user in the fields 220 and 222.

Figure 2C:
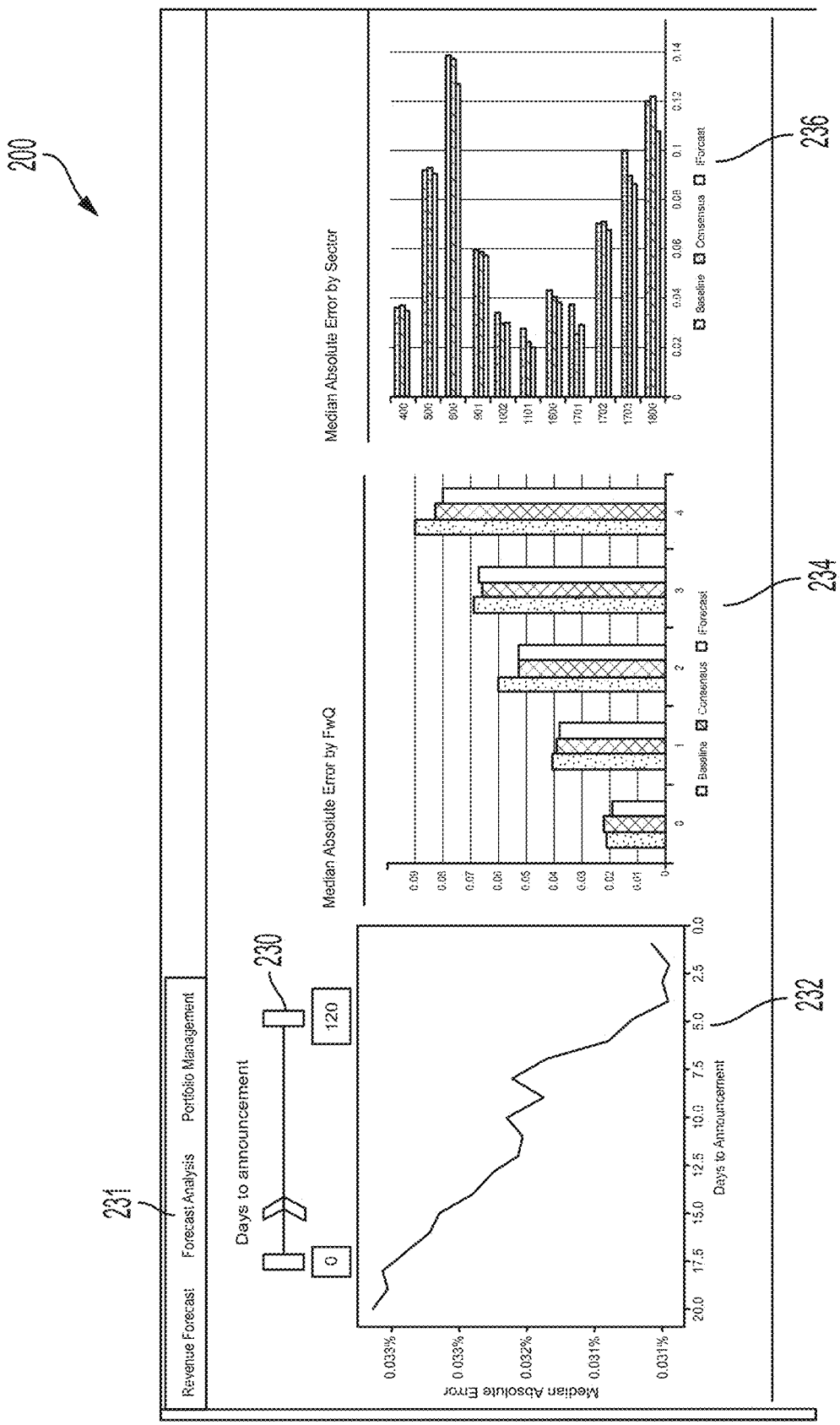
FIG. 2C is a diagram showing a user interface that can be used to implement explainable machine learning based on heterogeneous data in one embodiment.

In an example shown in FIG. 2C, the system 100 can output a forecast analysis page in response to an end user selecting a tab 231. The forecast analysis page can include one or more graphs 232, 234, 236, indicating performance metrics such as "Median Absolute Error", "Median Absolute Error by FwQ", and "Median Absolute Error by Sector", respectively. The forecast analysis page can also include an input control 230, which can be a slider, that allows the end user to select different amount of days leading up to a date of earnings announcement of Company A. The contents of the graphs 232, 234, 236 can change in response to the different amount of days being selected by the end user using the input control 230. For example, the end user can select ten days using the input control 230 and, in response, the processor 120 can identify data from the data repositories 106, the memory 122, and the outputs from the APIs 104, that can be applied with the model 130 to generate a forecast of performance metrics relating to Company A ten days prior to an earnings announcement date of Company A.

Figure 2D:
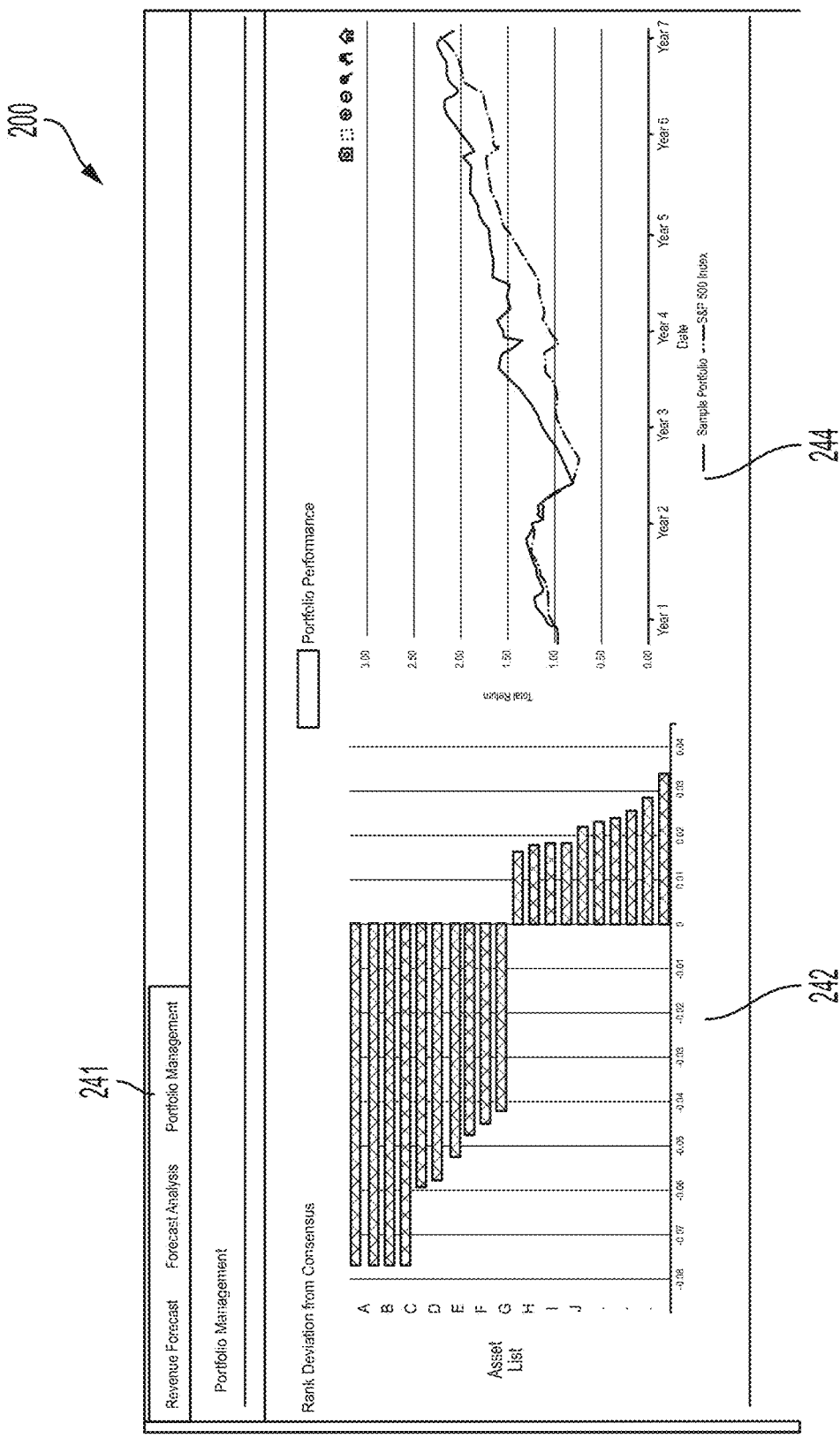
FIG. 2D is a diagram showing a user interface that can be used to implement explainable machine learning based on heterogeneous data in one embodiment.
Figure 2E:
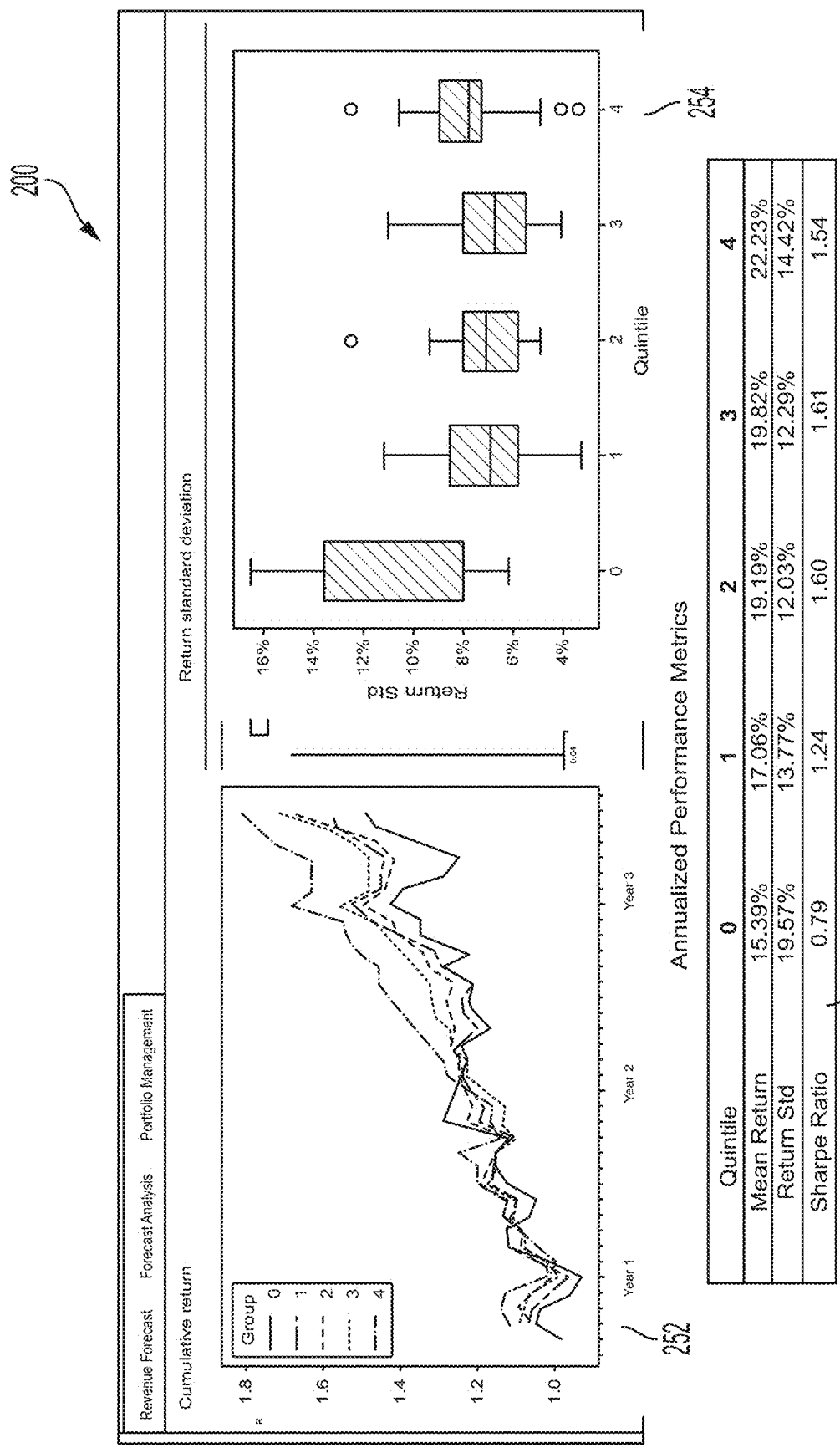
FIG. 2E is a diagram showing a user interface that can be used to implement explainable machine learning based on heterogeneous data in one embodiment.

In an example shown in FIG. 2D, the system 100 can output a portfolio management page in response to an end user selecting a tab 241. The portfolio management page can include one or more graphs 242, 244, indicating portfolio performance metrics such as "Rank Deviation from Consensus" and "Portfolio Performance", respectively. The portfolio performance metrics can be based on a plurality of assets selected by the end user. In another example shown in FIG. 2E, the portfolio management page can also include graphs 252, 254, 256, indicating portfolio performance metrics such as "Cumulative return", "Return standard deviation", and Annualized Performance Metrics", respectively. The end user can use the user interface 200 to select which graphs to be displayed by the asset management system 108.

Figure 3:
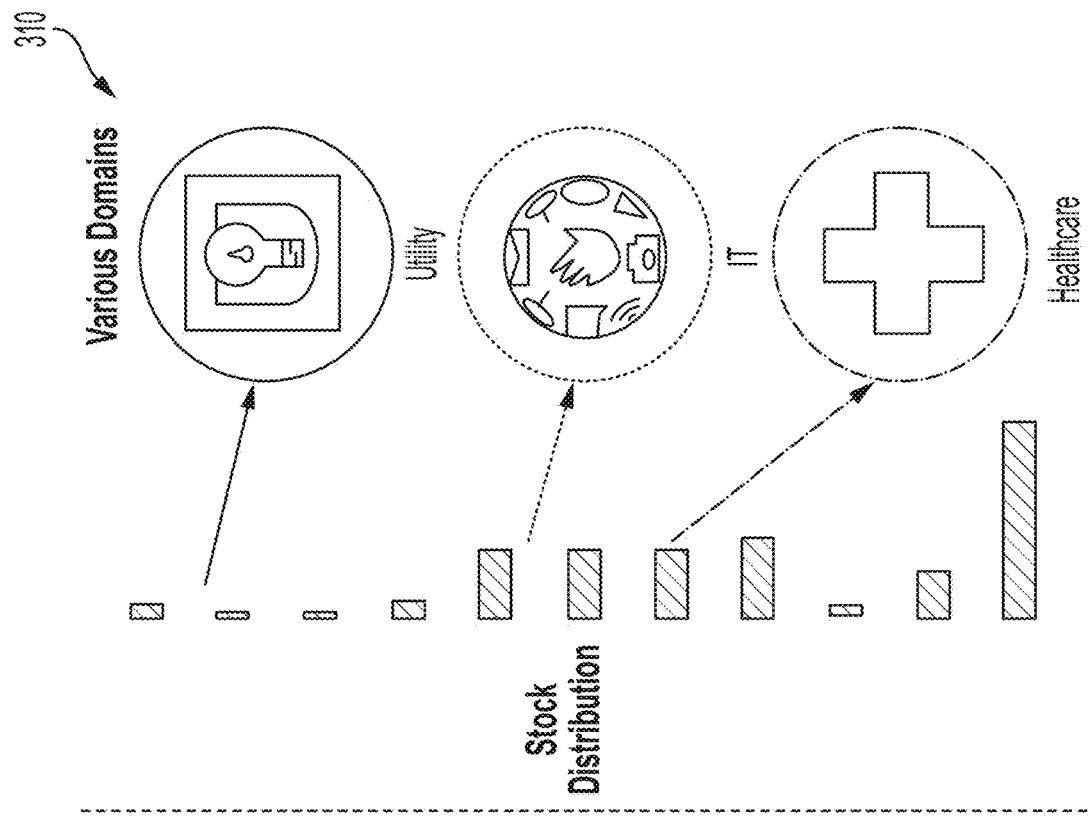
FIG. 3 is a diagram showing an example implementation of explainable machine learning based on heterogeneous data in one embodiment.
Figure 3:
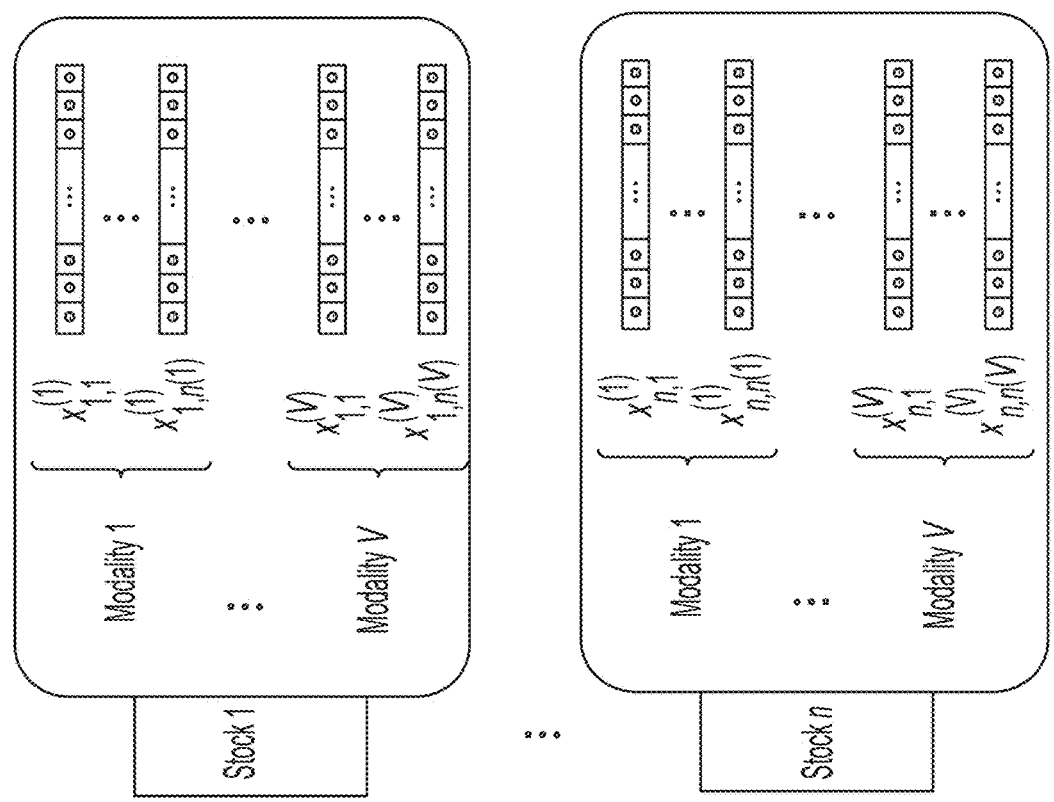

FIG. 3 is a diagram showing an example implementation of explainable machine learning based on heterogeneous data in one embodiment. FIG. 3 may include components that are labeled identically to components of FIGS. 1-2, which are not described again for the purposes of clarity. The description of FIG. 3 may reference at least some of the components of FIGS. 1-2.

In an example, the processor 120 can obtain a data set 310 that includes multi-modality time series data. The data set 310 can be obtained from the APIs 104, the memory 122, and/or the data model repositories. The data set 310 can include a number of observations (e.g., assets such as equities and stocks), and each observation can include data corresponding to a number of modalities (e.g., finance, weather, news, social media). Each modality can include at least one variable, and each variable can be a temporal sequence of data. For example, the data set 310 shown in FIG. 3 includes n observations (stock 1 . . . stock n), each observation includes a set of vectors corresponding to V modalities, and each set of data includes a number of variables that are temporal sequences of data. For example, a weather modality can include a variable representing hurricane in a geographical area, such that a temporal sequence of data of this variable can be a vector indicating occurrences of hurricane in the geographical area across different time instances. In some examples, the data set 310, such as the weather data, social media posts, or news article, may not be in a desirable format for training the model 130. In an embodiment, the processor 120 can be configured to derive various matrices and vectors (described below by way of example) to represent the values of the different modalities or variables among the data set 310.

In the descriptions below, the data set 310 can be denoted as a matrix X, where X={$X_1, X_2, \ldots, X_n$}, where n denotes the number of observations (e.g., stocks). For each observation matrix $X_i$, where i=1, 2, ..., n, the data among the data set 310 can be collected from m modalities, such that the matrix $X_i$={$X_i^{(1)}, X_i^{(2)}, \ldots, X_i^{(m)}$}. Within each modality $X_i^{(v)}$, where v=1, ..., m, there are data from $n^{(v)}$ variables, such that the matrix $X_i^{(v)}$ can be expressed as $X_i^{(v)}$={$x_{i,1}^{(v)}, x_{i,2}^{(v)}, \ldots, x_{i,n^{(v)}}^{(v)}$}, and each variable (which is a vector) $x_{i,f}^{(v)}$, f=1, ..., $n^{(v)}$ can be a temporal sequence in a previous relevant time T, such that the vector $x_{i,f}^{(v)}$ can be expressed as $x_{i,f}^{(v)}$={$x_{i,f}^{(v)}(1), \ldots, x_{i,f}^{(v)}(T)$}.

Since the data set 310 is obtained from multiple API domains, the impact or causal strength (with respect to one or more particular assets) of different modalities, or variables of the modalities, can vary across different domains. For example, as shown in FIG. 3, the data set 310 can include data obtained from different modalities, which can include finance, weather, news, social media, etc. Each modality can include different variables. For example, the finance modality can include variables corresponding to historical quarterly revenue, consensus, stock price, etc. Thus, each observation, or asset, $X_i$ for variable $f$ from modality v at time stamp t can have an independent effect on a target signal vector $y_i$, denoted as follows:

$$\hat{y}_{i,f}^{(v)}(t) = G(x_{i,f}^{(v)})$$

where G(•) denotes a time series forecasting model. Thus, the system 100 can train the time series forecast model, which produces future time stamp predictions, using the following formulation:

$$\hat{y}_i(\tau) = \sum_{t=1}^{T}\sum_{v=1}^{m}\sum_{i=1}^{n^{(v)}} \hat{y}_{i,f}^{(v)}(t) + B(\tau)$$

where τ=T+1, ..., T+T', T' denotes a future time stamp, and B(τ) is a baseline forecast (e.g., consensus estimates) at a time stamp τ. Thus, the trained model (e.g., model 130) can receive 1) multi-modality time series data X={$X_1, X_2, \ldots, X_n$} that varies from time stamp 1 to T (from, for example, the APIs 104), and 2) a target signal matrix Y={$y_1, y_2, \ldots, y_n$} that varies from time stamp 1 to T, as inputs. Based on these inputs, the model 130 can output a prediction $\hat{Y}$={$\hat{y}_1, \hat{y}_2, \ldots, \hat{y}_n$} from time stamp T+1 to time stamp T+T'. The prediction $\hat{Y}$ output from the model 130 can be forecasted performance metrics of one or more assets or portfolios, which can be represented as graphs in the user interface 200.

Figure 4:
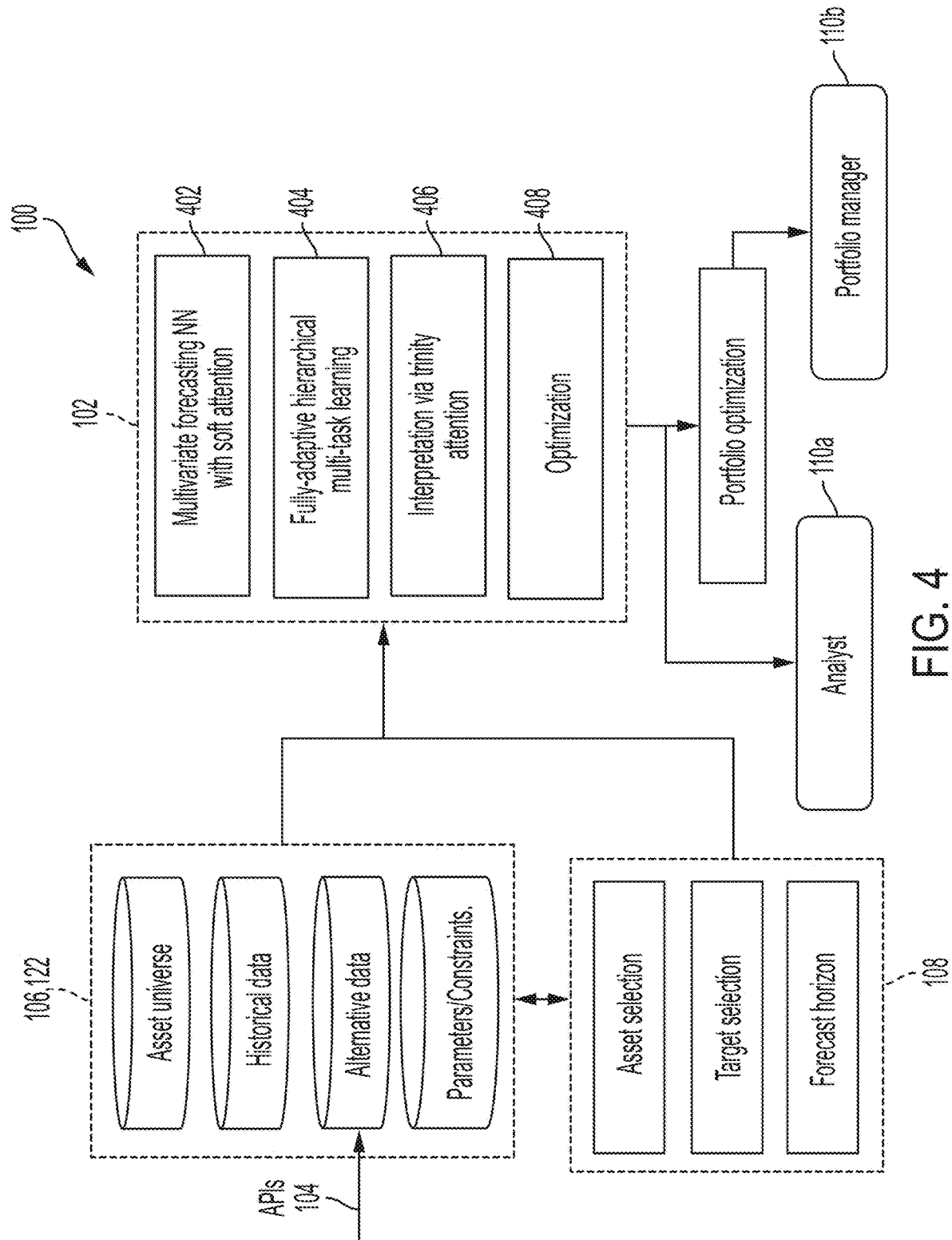
FIG. 4 is a diagram showing additional details of the example system shown in FIG. 1, in one embodiment.

FIG. 4 is a diagram showing additional details of the example system shown in FIG. 1, in one embodiment. FIG. 4 may include components that are labeled identically to components of FIGS. 1-3, which are not described again for the purposes of clarity. The description of FIG. 4 may reference at least some of the components of FIGS. 1-3.

In an example, the memory 122 and/or the data repositories 106 can be configured to store different types of data that can be used by the processor 120 to implement the system 100. For example, the memory 122 and/or the data repositories 106 can be configured to store an asset universe, historical data, alternative data, and parameters and/or constraints. An asset universe can be a database including a list of different assets and associations between different assets and different portfolios. Historical data can be data indicating historical performance metrics of different assets and portfolios. Alternative data can be data received from the APIs 104, and can be deemed as multi-modality time series data as the alternative data includes different types of data from different domains. For example, the alternative data can include, for example, domains such as news, social media, weather, online search engines, credit card usage logs, satellite images, and publications by media such as articles from finance magazines. Parameters and constraints can be selections made by end users, such as a number of assets to be included in a portfolio, selected time epochs for forecasting, and/or other information selected or defined by end users. In some examples, the parameters and constraints can include the target signal vector (described above) that can be used by the processor 120 or the model builder 102 to train the model 130. To be described in more detail below, the model builder 102 can train the model 130 using the alternative data in addition to historical data by integrating a plurality of components, or modules, 402, 404, 406, 408, shown in FIG. 4. As a result of using the alternative data to train the model 130, the forecasts generated by the application of the model 130 can be based on data from different domains in addition to conventional predictions based on historical performances. In some examples, the modules 402, 404, 406, 408 can be parts of a programmable hardware device including circuitry, each module being programmed to perform a specific set of tasks. In some examples, the modules 402, 404, 406, 408 can be software modules that can be implemented by the processor 120 (shown in FIG. 1).

The processor 120 can be integrated with the model builder 102, and can be configured to implement the model builder 102 to train the model 130. The model builder 102 can include a plurality of components or modules 402, 404, 406, 408. The module 402 can be implemented to develop a neural attention network that can be trained to model multi-modality time series data and to learn asset-specific attention vectors with respect to the relevant time stamps and modalities or variables. The construction of the model 130 can include training the model 130 using a neural attention network, which provides a feature of automatic branch procedures for capturing the hierarchical structures of various domains, and groups decisions at each layer from down to top, regarding with whom each task (e.g., each forecast prediction) should share the neural attention vectors.

The module 404 can be a machine learning module configured to train the neural attention network developed by the module 402 using multi-modality and multi-task time series data. The training includes modeling different multi-modality and multi-task time series data to forecast various performance metrics of assets and portfolios. The module 406 can be an interpretation module 406 configured to generate interpretations of the forecast outputs generated by the model 130. For example, the module 406 can output interpretations at the modalities or variables level, such as indicating which variable is more important for a particular type of asset (e.g., healthcare, finance, information technology, etc.). The module 406 can also output correlations and hierarchical structures of various domains, such as granular clusters of different assets and sectors and explanation of the clustering. The module 408 can be an optimization module configured to optimize the outputs from the model 130 based on various parameters and/or constraints that can be defined by an end user of the system 100.

The module 402 can develop the neural attention network, which can be a multivariate forecasting neural network with soft attention, using the data set 310, such as X= {$X_1, X_2, \ldots, X_n$} observed in T time stamps. The neural attention network can be a neural network structure with soft attention for the model G(•) with respect to the variable $f$ of an $i^{th}$ observation $X_i$. The neural attention network can include a number of hidden layers, such as a hidden layer denotes as $h_{i,f}^{(v)}$ and an attention layer denotes as $a_{i,f}^{(v)}$. Based on the layer structures of the neural attention network, the elements of the target signal vector $y_i$ can be denoted as follows:

$$\hat{y}_{i,f}^{(v)}(\tau) = \beta_{i,f}^{(v)}(\tau) h_{i,f}^{(v)}(\tau)$$

where $$h_{i,f}^{(v)}(\tau) = \tanh(w_h x_{i,f}^{(v)}(\tau) + b_h)$$

$$a_{i,f}^{(v)}(\tau) = \tanh(w_a h_{i,f}^{(v)}(\tau) + b_a)$$

$$\beta_{i,f}^{(v)}(\tau) = \frac{a_{i,f}^{(v)}(\tau)}{\sum_{i=1}^{n}\sum_{v=1}^{m}\sum_{f=1}^{n^{(v)}}\sum_{t=1}^{T} a_{i,f}^{(v)}(\tau)}$$

$\beta_{i,f}^{(v)}$ denotes a corresponding attention vector, $h_{i,f}^{(v)}$ denotes the hidden layer (of dimension d) of the neural attention network, $w_h$ denote a weight in the hidden layer, $b_h$ denote a bias in the hidden layer, $w_a$ denote a weight in the attention layer, $b_h$ denote a bias in the attention layer. $\beta_{i,f}^{(v)}$ denotes an attention vector that can be interpreted as a summary impact on the variable $f$ of the $v^{th}$ modality and $i^{th}$ observation $x_{i,f}^{(v)}$, in a context of other observations. In an example, the model builder 102 can determine an attention vector $a_{i,f}^{(v)}$ that indicates a measure of an importance of the observation $x_{i,f}^{(v)}$. The impact of each observation $x_{i,f}^{(v)}$ can be evaluated to identify a subset of observations that are considered as most important, which can be critical to the forecast prediction being outputted by the model 130.

The module 404 can train the neural attention network to construct the model 130. The training includes modeling the multi-modality and multi-task time series data to learn a plurality of attention vectors. As illustrated in FIG. 3, the input time series data (data set 310) includes a 2-level hierarchy, where the multiple modalities are on a first level and the multiple variables are at a second level. To use the data set 310 to train the neural attention network, the system 100 can define various parameters and constraints. For example, in predicting an actual price of an asset that belongs to the information technology sector, modalities finance and news can be relative more relevant than other modalities such as weather. Thus, the neural attention network can be trained using a loss function $\mathcal{L}(\tau)$ to addressing data heterogeneity among the data set 310, where $\mathcal{L}(\tau)$ can include terms indicating a prediction loss, a sparse attention regularizer, and a consensus regularizer:

$$\mathcal{L}(\tau) = \mathcal{L}_Y(\tau) + \mathcal{L}_S(\tau) + \mathcal{L}_C(\tau)$$

$$\mathcal{L}_Y(\tau) = \sum_{i=1}^{n}|y_i(\tau) - \hat{y}_i(\tau)|$$

$$\mathcal{L}_S(\tau) = \gamma \sum_{i=1}^{n}\sum_{v=1}^{m}\sum_{f=1}^{n^{(v)}}\sum_{t=1}^{T}|a_{i,f}^{(v)}(t)|$$

$$\mathcal{L}_C(\tau) = \eta \sum_{i=1}^{n}\sum_{v=1}^{m}\sum_{f=1}^{n^{(v)}}|z_i^{(v)}(\tau) - \beta_{i,f}^{(v)}(\tau)|$$

where $z_i^{(v)}$ denotes the consensus embedding, $\gamma$ and $\eta$ are hyper parameters for balancing the impact of this term on the overall objective function. For timestamp $\tau$, the first term $\mathcal{L}_Y$ denotes a measurement of the prediction error via mean squared error; the second term $\mathcal{L}_S$ corresponds to the sparse regularizer (corresponding to clustered modalities that may have less relevance, such as below a threshold defined by the system 100), where an $L_1$ norm can be adopted over the unnormalized attention vectors $a_{i,f}^{(v)}$ to select one or more key modalities or variables for each observation in the previous T timestamps. The third term $\mathcal{L}_C$ denotes a consensus regularizer, which enforces the consistency across variables within the same modality by mapping all the normalized attention vectors $\beta_{i,f}^{(v)}$ to a consensus embedding $z_i^{(v)}$ for each modality v. Using this loss function in the training, the different modalities and different impact on an observation can be taken into account during the training to learn the attention vectors and to construct the model 130. Such embodiment may address the challenge of data heterogeneity (e.g., training the model 130 with multi-modality data, instead of training different models for different data set from different modalities or domains).

Figure 5:
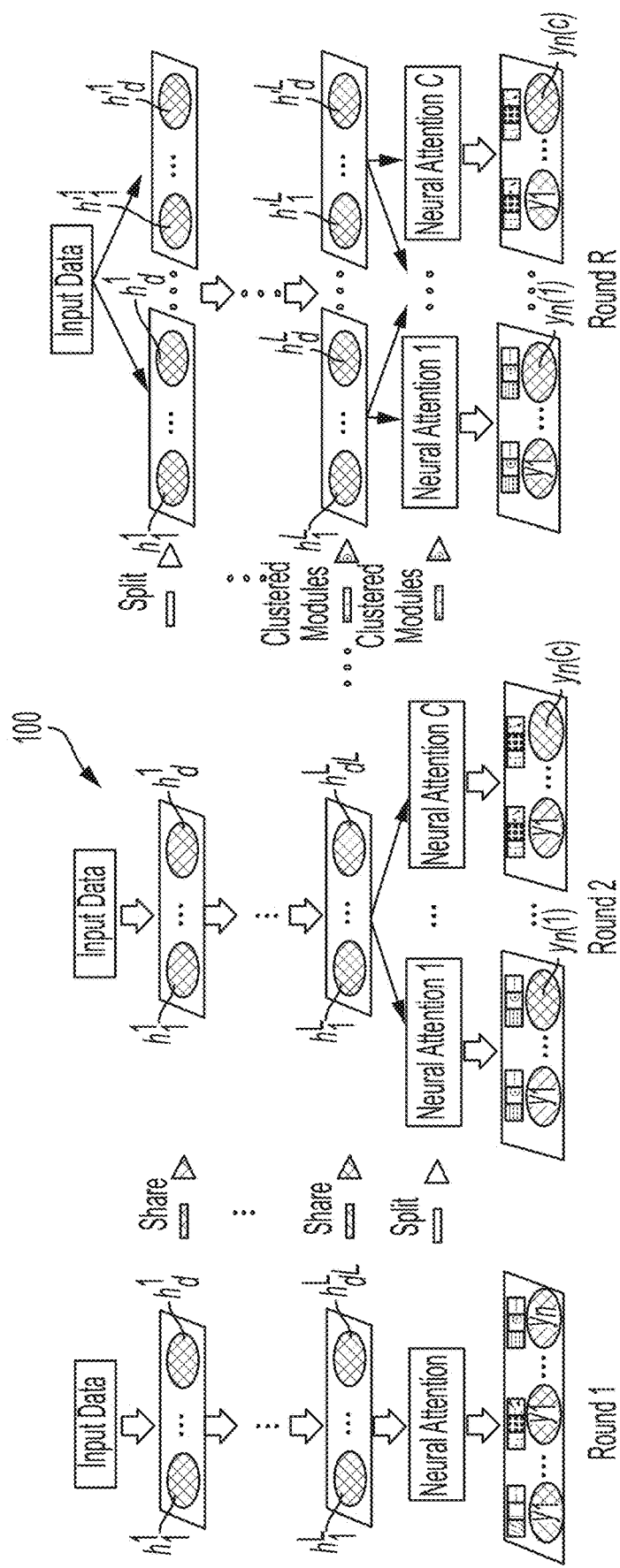
FIG. 5 is a diagram showing additional details of the example system shown in FIG. 1, in one embodiment.

FIG. 5 is a diagram showing additional details of the example system shown in FIG. 1, in one embodiment. The description of FIG. 5 may reference at least some of the components of FIGS. 1-4.

To address task heterogeneity, a fully-adaptive hierarchical clustering strategy for multi-task learning can be used to train the neural attention network. In an example, different assets from the same domain may share similar attention vectors and exhibit similar patterns. For example, a healthcare asset may rely on the news relating to food and medicine, such as a positive report in the news can increase a price of the asset and a negative report in the news can decrease the price of the asset. Such an observation can indicate relationships between attention vectors for different assets or tasks by grouping similar assets or tasks into the same cluster. The module 404 can train the neural attention network by splitting and widening particular layers of neural networks. In an example, if the neural attention network includes L layers, the module 404 can split and widen the layers from layer L up to layer 1, as shown in FIG. 5.

In FIG. 5, the split and widen procedure can include multiple rounds of training to construct the model 130 are shown. Round 1 includes the development of the neural attention network (by the module 402) with L layers, and a derivation of an affinity matrix for the $L^{th}$ layer by computing the cosine similarities over each pair of attention vectors. At the beginning of Round 2, the module 404 groups n assets or observations into $c^L$ clusters based on the affinity matrix. The module 404 further clones the $(L-1)^{th}$ layer by directly copying the hidden weights of the neural attention network for $c^L-1$ time, resulting in a total of $c^L$ individual neural networks in the $(L-1)^{th}$ layer. The module 404 can link the n observations or assets to the $c^L$ neural networks in the $(L-1)^{th}$ layer. Starting from Round l=3 up to Round R, the module 404 continues to compute the affinity matrix for grouping the hidden units in the previous $(l+1)^{th}$ layer, and perform the split and widen procedure in the current $l^{th}$ layer. Such procedures are repeated until the layer could not be further divided or until the procedure reaches the top of the neural network (Layer 1).

To perform the split and widen, the module 404 can determine the attention vector for each individual observation $X_i$. The module 404 can derive an affinity matrix $A^L \in R^{n \times n}$ at layer L by computing the cosine similarities of each pair of the weights of the neural attention network. The similarity between the weight of the $i^{th}$ branch, which is $w_i$, and the weight of the $j^{th}$ branch, which is $w_j$, is determined by:

$$A(i,j)^l = \frac{w_i \cdot w_j}{\|w_i\| \|w_j\|}$$

where l=1, ..., L, and $\|\cdot\|$ denotes a $L_2$ norm. The module 404 can determine an optimal number of clusters to assign the different task using the determined similarity. The assignment of the tasks to the clusters is performed under the constraint to minimize the loss function as follows:

$$\mathcal{L}_c{}^l = \mathcal{L}_{sc} + c^l(\alpha)^l$$

where $\alpha \in (0, 1)$ is a positive parameter and $\mathcal{L}_{sc}$ is the total spectral clustering loss. The second part $c^l(\alpha)^l$ of this equation is a penalty term, which constrains the number of clusters $c^l$ at the $l^{th}$ layer that is being split and widen (or a split layer). In an example, the loss can increase as the network structure us being updated from the layer L to layer 1, thus the number of clusters can decrease from the layer L to layer 1.

In an example, at the beginning of Round 2 in FIG. 5, the $L^{th}$ layer becomes the split layer. The $L^{th}$ layer can be decomposed into $c^l$ branches and back link to the $(L-1)^{th}$ layer. The weight of each newly-created branch at layer l can be initialized by directly copying the weight from the current split layer. In other words, the $(c-1)^l$ branches at layer l are cloned and the neural network is re-linked. The module 404 can re-train the updated neural network for a number of iterations using the same procedures to find the similarities of each pair of branches by computing the cosine similarities of their weights. Such procedures are repeated until the layer could not be further divided or until the procedure reaches the top of the neural network (Layer 1). Such training procedures allows the system 100 to train the model 130 using multi-task time series data, instead of training individual models for data set from different tasks. For example, if $g_i(M)$ denotes a model for a task M (e.g., forecast a performance metric M) based on domain i, the system 100 can learn one task $g_1(M)g_2(M)g_i(M)$ instead of individual models $g_1(M)$, $g_2(M)$, $g_i(M)$.

The module 406 can perform an end-user oriented interpretation via trinity attention. The trinity attention mechanism implemented by the module 406 can learn the independent importance weight over tasks (e.g., sectors), time and modalities. In particular, based on the aforementioned fully-adaptive multi-task learning mechanism, the assets automatically form R-level hierarchical clusters; each cluster $C^{(l)}$ at the $l^{th}$ level represents a set of assets that share the same or similar attention matrix $\beta \in \mathbb{R}^{T \times F}$, where F= $\Sigma_{v=1}^m n^{(v)}$ denotes the total number of variables, and each entry in $\beta$ indicates the variable-wise temporal importance for predicting the target signals Y. Moreover, in order to extract distinguishable attention distribution for end users, the module 406 can implement a summarization function $f_{agg}: \mathbb{R}^{A \times B} \to \mathbb{R}^B$ to independently quantify the temporal importance distribution and the variable importance distribution as follows:

$$\beta_{var} = f_{agg}(\beta) = \left[ \frac{\sum_t^T \beta(t,1)}{\sum_t^T \sum_f^F \beta(t,f)}, \ldots, \frac{\sum_t^T \beta(t,F)}{\sum_t^T \sum_f^F \beta(t,f)} \right]$$

$$\beta_{temp} = f_{agg}(\beta^T) = \left[ \frac{\sum_f^F \beta(1,f)}{\sum_t^T \sum_f^F \beta(t,f)}, \ldots, \frac{\sum_f^F \beta(T,f)}{\sum_t^T \sum_f^F \beta(t,f)} \right]$$

where the unified variable-wised attention vector $\beta_{var}$ follows $\Sigma_f^F \beta_{var}(f)=1$, $\beta_{var}(f) \in [0,1]$, and the unified temporal-wise attention vector $\beta_{temp}$ follows $\Sigma_t^T \beta_{temp}(t)=1$, $\beta_{temp}(t) \in [0,1]$. By determining the attention vectors, the system 100 can generate forecasts indicating different performance metrics of assets and portfolios with respect to the domains associated with these attention vectors. A performance metric with respect to an attention vector associated with a domain provides an indication of an impact level or importance of the domain on the performance vector.

The module 408 can be configured to implement an optimization algorithm shown below:

Input:
    (1) Multi-modality time series $\chi = (X_1, X_2, \ldots, X_n)$;
    (2) History data of the target signal $Y = (y_1, y_2, \ldots, y_n)$;
    (3) Forecasting baseline model B(•);
    (4) Previous relevant time T;
    (5) Total number of training round R.
Output:
    Predictions of target signal $\hat{Y} = \{\hat{y}_1, \hat{y}_2, \ldots, \hat{y}_n\}$ in the future T' time stamps.
1:  Pre-train the proposed neural attention network and compute the independent attention vector $\beta_i$ for each observation $X_i$.
2:  Let l = L, r = 1.
3:  while Stopping criterion is not satisfied and r ≤ R do
4:    Compute the affinity matrix $A^l$ for $l^{th}$ layer in Eq. 2.
5:    Determine the number of clusters by minimize $\mathcal{L}_c{}^l$ in Eq. 3.
6:    Create branches in the $l^{th}$ layer and update the network structures in the $l^{th}$ and $(l-1)^{th}$ layers.
7:    Update the hidden layers' parameters by minimizing $\mathcal{L}(r)$ in Eq. 1.
8:    let l ← l − 1, r ← r + 1.
9:  end while The inputs of the optimization algorithm can include the observed time series $X = \{X_1, X_2, \ldots, X_n\}$, the history data of the target signal $Y = \{y_1, y_2, \ldots, y_n\}$, the forecasting baseline model B(•), the number of relevant historical time stamps T, and the number of training rounds R (e.g., the rounds as shown in FIG. 5). The optimization algorithm can pre-train the neural attention network developed by the module 402, and compute the attention vector $\beta_i$ for each time series observations $X_i$ independently. Steps 3-9 of the optimization algorithm are operations, that can be performed by the module 404, pertaining to the learning process to construct the model 130. At each layer l, the optimization algorithm computes the affinity matrix $A^l$ relating to the task similarities. Also, by determining the number of clusters (e.g., branches) based on $\mathcal{L}_C^l$, the optimization algorithm can generate branches and assign similar tasks into the same branch. The optimization algorithm stops when the stopping criterion (e.g., maximum running time, error rate lower bound) is satisfied and when r>R. Thus, the model 130 can be optimized by training the neural attention network with stochastic gradient descent (SGD) until convergence on the validation set.

Figure 6A:
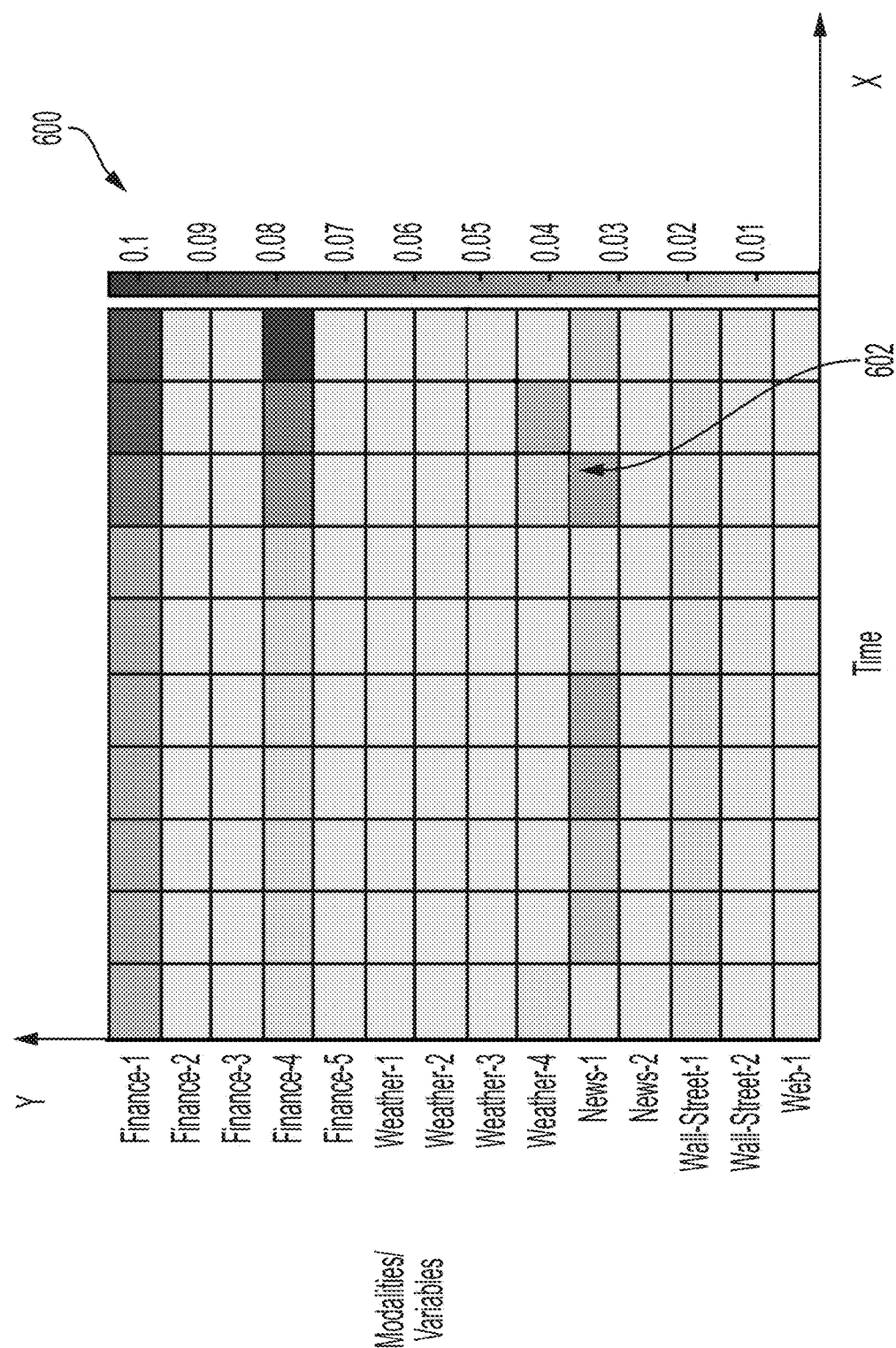
FIG. 6A is a diagram showing a result from an implementation of the example system shown in FIG. 1, in one embodiment.
Figure 6B:
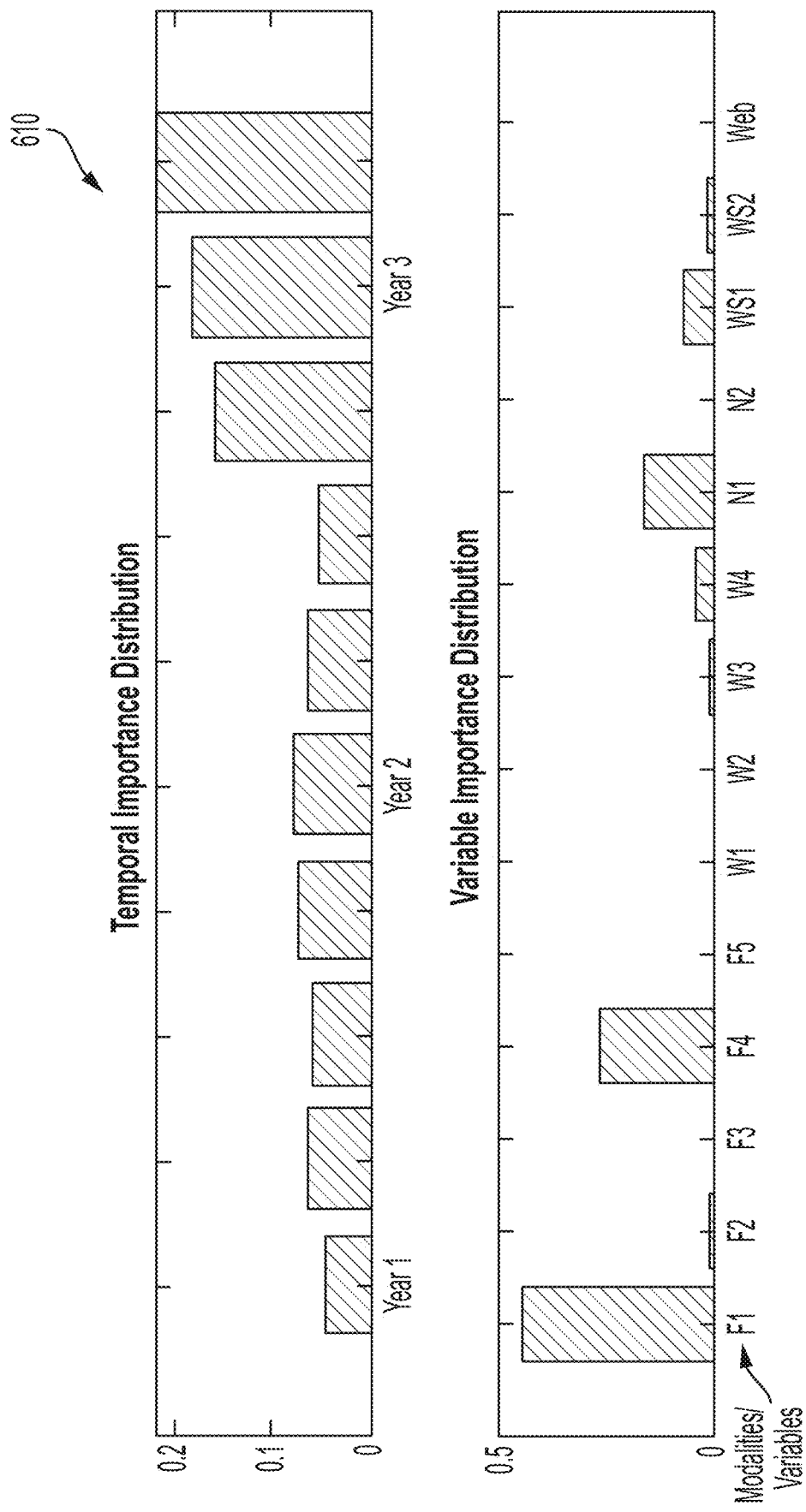
FIG. 6B is a diagram showing a result from an implementation of the example system shown in FIG. 1, in one embodiment.
Figure 6C:
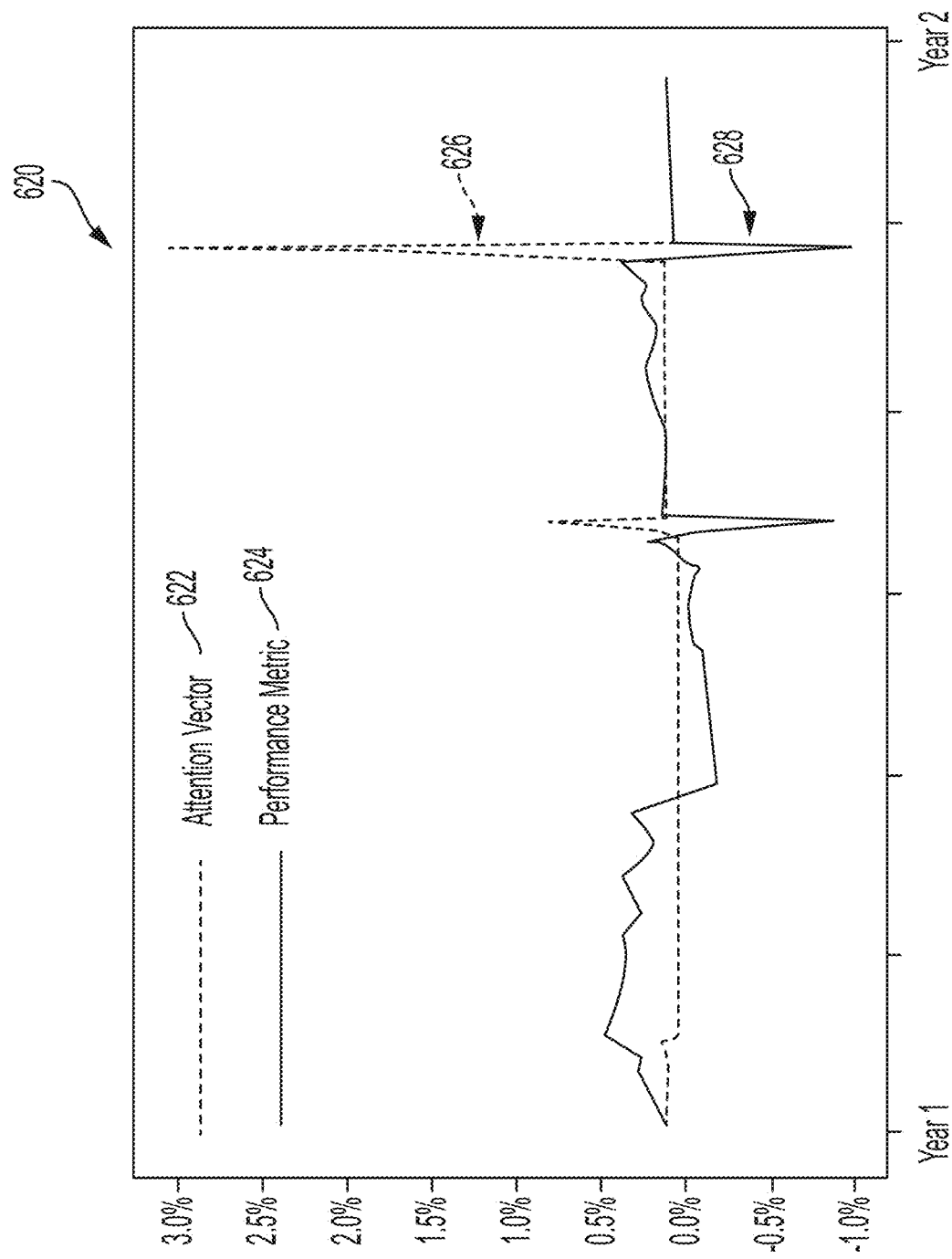
FIG. 6C is a diagram showing a result from an implementation of the example system shown in FIG. 1, in one embodiment.

FIGS. 6A-6C are diagrams showing results from an implementation of the example system shown in FIG. 1, in one embodiment. The description of FIGS. 6A-6C may reference at least some of the components of FIGS. 1-5.

In an example shown in FIG. 6A, an attention heat map 600 can be generated by the system 100 as a result of the implementation of the module 406. The attention heat map can indicate the importance of different attention vectors of an asset. In the attention heat map 600, the x-axis represents the time, the y-axis represents variables from multiple modalities, and the darker the shading, the larger the attention value, e.g. more important. The attention heat map 600 provides end users visualized explanation or interpretation of the driven variables to the prediction output over time, allowing end users to target on specific time and variables for further investigation. The attention vectors can be aggregated along time based on the unified temporal-wise attention vector $\beta_{temp}$, or along variable dimensions based on the unified variable-wised attention vector $\beta_{var}$.

In an example shown in FIG. 6B, a summary attention 610 can be generated by the system 100 as a result of the implementation of the module 406. The summary attention 610 can, for example, indicate (1) the temporal importance is increasing over time, which indicates the relevance of data is higher when the time is closer to the forecasting time stamp, and (2) the finance variables play a central role for predicting revenue surprise. In an example, a comparison of the attention heat map and the summary attention of different assets in different domains can provide guidance for end users to investigate the correlation and difference between multiple tasks. For example, a particular box 602 (corresponding to a news variable News-1) in the heat map 600 for a first company can have a darker shade than the box 602 in another heat map for a second company. Thus, such comparison can indicate that the variable News-1 appears to be more important to the first company than the second company.

In an example shown in FIG. 6C, a graph 620 can be generated by the system 100 as a result of the implementation of the module 406. The graph 620 can be, for example, a graph indicating an impact of an attention vector 622 corresponding to a specific domain on a performance metric 624. The attention vector 622 and the performance metric 624 can be generated as a result of the application of the model 130 on a set of input data, such as input data indicating a request to forecast a particular performance metric of a particular asset. In the example shown in FIG. 6C, the performance metric 624 experiences a negative spike 628 while an attention vector experiences a positive spike 626 at the same time. The occurrences of the positive spike 626 and the negative spike 628 at the same time indicates an impact of a domain association with the attention vector 622 on the performance metric 624. For example, if the attention vector 622 corresponds to the weather domain or modality, and corresponds to a variable of "hurricane" within the weather domain, the positive spike 626 can indicate that a hurricane has occurred at a particular time. If the particular asset is an agricultural company, the performance metric 624 can experience the negative spike 628 in response to the positive spike 626, which indicate that the occurrence of hurricanes can impact the performance metrics of the particular asset negatively.

In an example, an implementation of the system 100 can forecast performance metrics with an accuracy that can be higher than other benchmark systems. For example, the implementation of the system 100 can forecast a median absolute deviation of an asset that is lower than predictions generated by other benchmark systems. The training of the model 130 using multi-modality and multi-task time series data allows the system 100 to provide profitability performance and descriptive capabilities that are superior to other benchmark systems. In another example, system 100 can simulate a portfolio and forecast performance metrics of the simulated portfolio. For example, the system 100 can select a set of assets (e.g., top performing companies) in a time period, set the weights of each asset proportionally to a corresponding revenue surprise forecast (e.g., a performance metric indicating potentially surprising positive earnings outputted by the model 130), update the weights of each asset periodically based on the latest revenue surprise forecast, and map the portfolio value with the updated weights to different times. The portfolio values across the different times can indicate a forecasted performance of a simulated portfolio that includes the selected set of assets.

Figure 7:
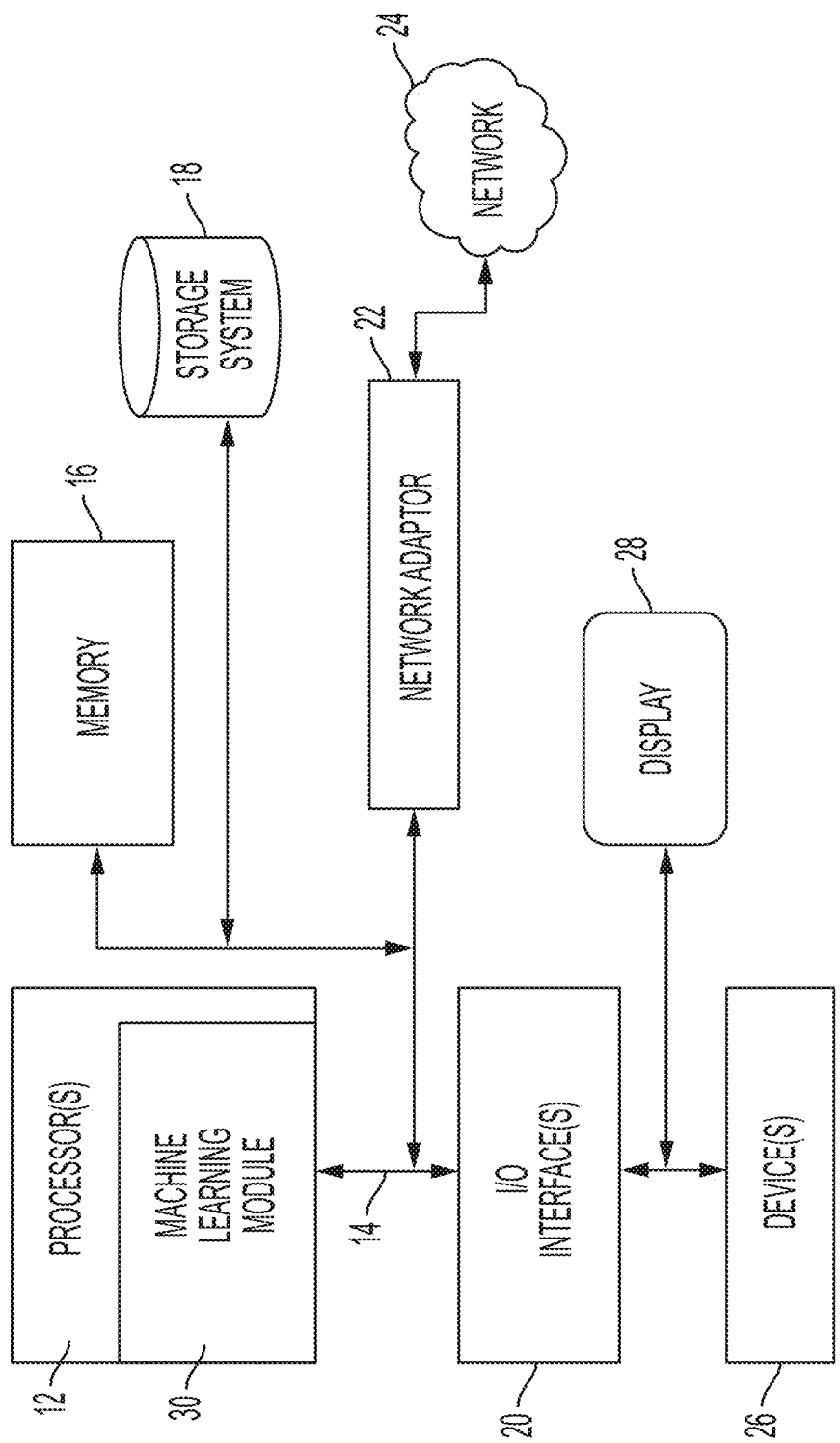
FIG. 7 illustrates a schematic of an example computer or processing system relating to explainable machine learning based on heterogeneous data in one embodiment.

FIG. 7 illustrates a schematic of an example computer or processing system that may implement explainable machine learning based on heterogeneous data in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., machine learning module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 8:
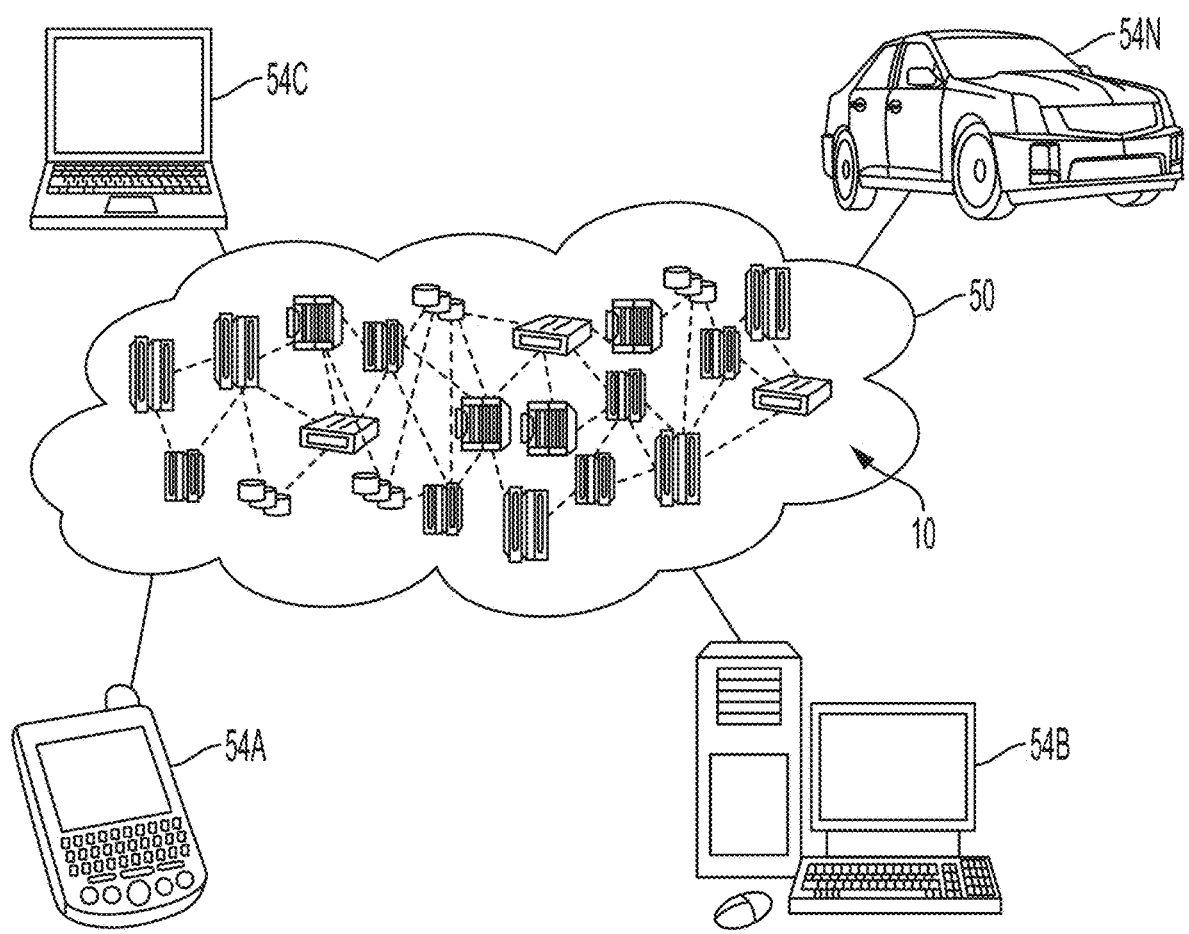
FIG. 8 depicts a cloud computing environment according to an embodiment of the present invention.

FIG. 8 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 9:
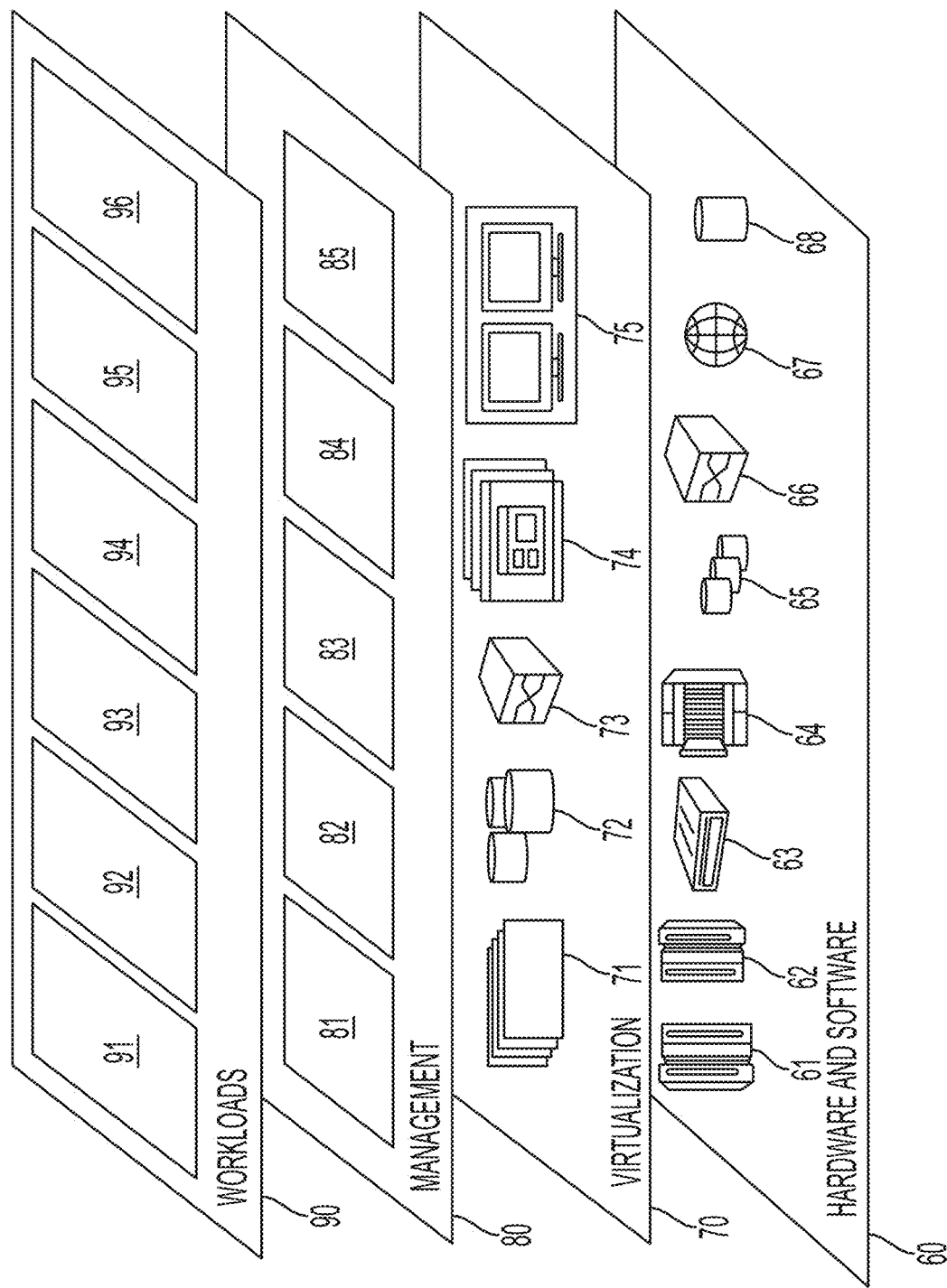
FIG. 9 depicts abstraction model layers according to an embodiment of the present invention.

FIG. 9 depicts abstraction model layers according to an embodiment of the present invention. Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and explainable learning 96.

Figure 10:
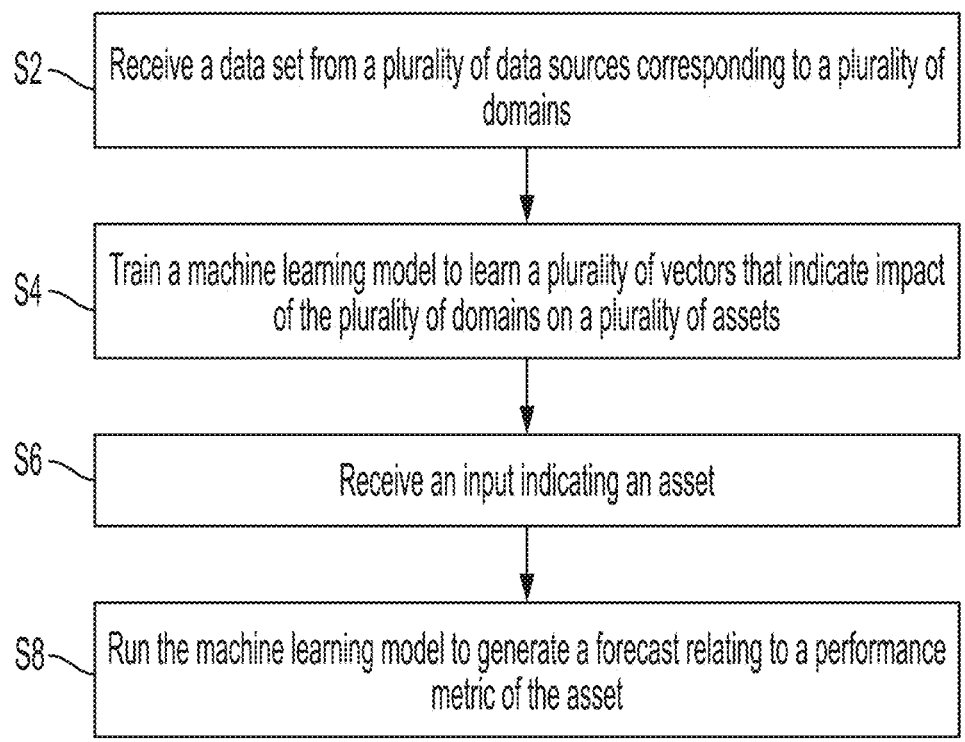
FIG. 10 is a flow diagram illustrating a process that can be performed by a processor to implement explainable machine learning based on heterogeneous data in one embodiment.

FIG. 10 is a flow diagram illustrating a process that can be performed by a processor to implement explainable machine learning based on heterogeneous data in one embodiment. An example process may include one or more operations, actions, or functions as illustrated by one or more of blocks S2, S4, S6, and/or S8. Although illustrated as discrete blocks, various blocks may be divided into additional blocks, combined into fewer blocks, eliminated, or performed in parallel, depending on the desired implementation. The description of the flow diagram of FIG. 3 may reference at least some of the components of FIGS. 1-2.

Processing can begin at block S2. At block S2, a processor can receive a data set from a plurality of data sources corresponding to a plurality of domains. Processing can continue from block S2 to block S4. At block S4, the processor can train a machine learning model to learn a plurality of vectors that indicate impact of the plurality of domains on a plurality of assets. The machine learning model can be operable to generate forecasts relating to performance metrics of the plurality of assets based on the plurality of vectors. In some examples, the machine learning model can be a neural attention network with shared hidden layers. In some examples, the machine learning model can be a neural attention network with L layers. In some examples, the training of the machine learning model can include performing a procedure that includes at least (i) deriving an affinity matrix for a $L^{th}$ layer; (ii) grouping n assets into $c^L$ clusters based on the affinity matrix; (iii) cloning the $(L-1)^{th}$ layer by copying hidden weights of the neural attention network for $c^L-1$ time, such that the $(L-1)^{th}$ layer includes $c^L$ neural networks; and (iv) linking the n assets to the $c^L$ neural networks in the $(L-1)^{th}$ layer. The procedure can be performed by the processor, iteratively, from layer l=L to layer l=1.

Processing can continue from block S4 to block S6. At block S6, the processor can receive an input indicating an asset. Processing can continue from block S6 to block S8. At block S8, the processor can run the machine learning model to generate a forecast relating to a performance metric of the asset. In some examples, the processor can further run the machine learning model to generate interpretations of the forecast, where the interpretation can be indicative of importance of the different domains to the asset.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
a memory;
a processor comprising hardware, the processor is configured to be in communication with the memory, and the processor is configured to:
receive a data set from a plurality of data sources corresponding to a plurality of domains;
train a machine learning model to learn a plurality of vectors that indicate impact of the plurality of domains on a plurality of assets, wherein the machine learning model is operable to generate forecasts relating to performance metrics of the plurality of assets based on the plurality of vectors, the machine learning model is a neural attention network with L layers, and the processor is further configured to train the machine learning model by performing a procedure that includes at least:
derive an affinity matrix for a $L^{th}$ layer;
group n assets into $c^L$ clusters based on the affinity matrix;
clone the $(L-1)^{th}$ layer by copying hidden weights of the neural attention network for $c^L-1$ time, such that the $(L-1)^{th}$ layer includes $c^L$ neural networks; and
link the n assets to the $c^L$ neural networks in the $(L-1)^{th}$ layer.

2. The system of claim 1, wherein the machine learning model is a neural attention network with shared hidden layers.

3. The system of claim 1, wherein the processor is configured to
receive an input indicating an asset; and
run the machine learning model to:
generate a forecast relating to a performance metric of the asset; and
generate interpretations of the forecast, the interpretation being indicative of importance of the plurality of domains to the asset.

4. The system of claim 1, wherein the processor is configured to perform the procedure iteratively from layer l=L to layer l=1.

5. The system of claim 1, wherein the processor is configured to derive the affinity matrix for the $L^{th}$ layer by computing the cosine similarities of each pair of weights of the neural attention network.

6. The system of claim 1, wherein the processor is configured to group the n assets into $c^L$ clusters by:
determining an optimal number of clusters based on the cosine similarities; and
assigning the n assets to the $c^L$ clusters based on a constraint to minimize a loss function being used to train the machine learning model, wherein the constraint sets a number of clusters $c^l$ at the $l^{th}$ layer to undergo the procedure.

7. The system of claim 1, wherein the processor is configured to clone the $(L-1)^{th}$ layer by:
decomposing the $L^{th}$ layer into $c^l$ branches;
linking the $c^l$ branches to the $(L-1)^{th}$ layer;
initializing weights of each branch among the $c^l$ branches at layer l by copying weights from the $L^{th}$ layer; and
re-training the neural attention network with the linked $c^l$ branches and the initialized weights of the $c^l$ branches by deriving a new affinity matrix and perform the procedure until the procedure reaches a layer that cannot be decomposed into branches or until the procedure reaches the layer l=1.

8. A computer-implemented method comprising:
receiving, by a processor, a data set from a plurality of data sources corresponding to a plurality of domains;
training, by the processor, a machine learning model to learn a plurality of vectors that indicate impact of the plurality of domains on a plurality of assets, wherein the machine learning model is operable to generate forecasts relating to performance metrics of the plurality of assets based on the plurality of vectors, and the machine learning model is a neural attention network with L layers, and training the machine learning model comprises performing a procedure that includes at least:
deriving an affinity matrix for a $L^{th}$ layer;
grouping n assets into $c^L$ clusters based on the affinity matrix;
cloning the $(L-1)^{th}$ layer by copying hidden weights of the neural attention network for $c^L-1$ time, such that the $(L-1)^{th}$ layer includes $c^L$ neural networks; and
linking the n assets to the $c^L$ neural networks in the $(L-1)^{th}$ layer.

9. The computer-implemented method of claim 8, wherein the machine learning model is a neural attention network with shared hidden layers.

10. The computer-implemented method of claim 8, further comprising:
receiving, by the processor, an input indicating an asset; and
running, by the processor, the machine learning model to generate a forecast relating to a performance metric of the asset; and
running, by the processor, the machine learning model to generate interpretations of the forecast, the interpretation being indicative of importance of the different domains to the asset.

11. The computer-implemented method of claim 8, further comprising performing the procedure iteratively from layer l=L to layer l=1.

12. The computer-implemented method of claim 8, wherein deriving the affinity matrix for the $L^{th}$ layer comprises computing the cosine similarities of each pair of weights of the neural attention network.

13. The computer-implemented method of claim 8, wherein grouping the n assets into $c^L$ clusters comprises:
   determining an optimal number of clusters based on the cosine similarities; and
   assigning the n assets to the $c^L$ clusters based on a constraint to minimize a loss function being used to train the machine learning model, wherein the constraint sets a number of clusters $c^l$ at the $l^{th}$ layer to undergo the procedure.

14. The computer-implemented method of claim 8, wherein cloning the $(L-1)^{th}$ layer comprises:
   decomposing the $L^{th}$ layer into $c^l$ branches;
   linking the $c^l$ branches to the $(L-1)^{th}$ layer;
   initializing weights of each branch among the $c^l$ branches at layer l by copying weights from the $L^{th}$ layer; and
   re-training the neural attention network with the linked $c^l$ branches and the initialized weights of the $c^l$ branches by deriving a new affinity matrix and perform the procedure until the procedure reaches a layer that cannot be decomposed into branches or until the procedure reaches the layer l=1.

15. A computer program product for explainable machine learning, the computer program product comprising a computer readable storage medium having program instructions embodied therewith, the program instructions executable by a processor of a device to cause the device to:
   receive a data set from a plurality of data sources corresponding to a plurality of domains; and
   train a machine learning model to learn a plurality of vectors that indicate impact of the plurality of domains on a plurality of assets, wherein the machine learning model is operable to generate forecasts relating to performance metrics of the plurality of assets based on the plurality of vectors, the machine learning model is a neural attention network with L layers, and the program instructions are executable by the processor of the device to cause the device to train the machine learning model by performing a procedure that comprises:
      derive an affinity matrix for a $L^{th}$ layer;
      group n assets into $c^L$ clusters based on the affinity matrix;
      clone the $(L-1)^{th}$ layer by copying hidden weights of the neural attention network for $c^L-1$ time, such that the $(L-1)^{th}$ layer includes $c^L$ neural networks; and
      link the n assets to the $c^L$ neural networks in the $(L-1)^{th}$ layer.

16. The computer program product of claim 15, wherein the machine learning model is a neural attention network with shared hidden layers.

17. The computer program product of claim 15, wherein the program instructions are executable by the processor of the device to cause the device to run the machine learning model to:
   receive an input indicating an asset;
   run the machine learning model to generate a forecast relating to a performance metric of the asset; and
   run the machine learning model to generate interpretations of the forecast, the interpretation being indicative of importance of the different domains to the asset.

18. The computer program product of claim 15, wherein the derivation of the affinity matrix for the $L^{th}$ layer comprises computing the cosine similarities of each pair of weights of the neural attention network.

19. The computer program product of claim 15, wherein to group the n assets into $c^L$ clusters, the program instructions are executable by the processor of the device to cause the device to run the machine learning model to:
   determine an optimal number of clusters based on the cosine similarities; and
   assign the n assets to the $c^L$ clusters based on a constraint to minimize a loss function being used to train the machine learning model, wherein the constraint sets a number of clusters $c^l$ at the $l^{th}$ layer to undergo the procedure.

20. The computer program product of claim 15, wherein to clone the $(L-1)^{th}$ layer, the program instructions are executable by the processor of the device to cause the device to run the machine learning model to:
   decompose the $L^{th}$ layer into $c^l$ branches;
   link the $c^l$ branches to the $(L-1)^{th}$ layer;
   initialize weights of each branch among the $c^l$ branches at layer l by copying weights from the $L^{th}$ layer; and
   re-train the neural attention network with the linked $c^l$ branches and the initialized weights of the $c^l$ branches by deriving a new affinity matrix and perform the procedure until the procedure reaches a layer that cannot be decomposed into branches or until the procedure reaches the layer l=1.

\* \* \* \* \*